United States Patent
Onizawa et al.

(10) Patent No.: US 7,591,505 B2
(45) Date of Patent: Sep. 22, 2009

(54) SHEET-FORM WINDOW MEMBER AND WINDOW STRUCTURE

(75) Inventors: Tomomitsu Onizawa, Chiyoda-ku (JP); Toshiaki Hotaka, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 10/555,169

(22) PCT Filed: May 10, 2004

(86) PCT No.: PCT/JP2004/006562

§ 371 (c)(1),
(2), (4) Date: Nov. 1, 2005

(87) PCT Pub. No.: WO2004/099295

PCT Pub. Date: Nov. 18, 2004

(65) Prior Publication Data

US 2006/0131928 A1   Jun. 22, 2006

(30) Foreign Application Priority Data

May 12, 2003   (JP)   ............... 2003-132753

(51) Int. Cl.
*B29C 39/12* (2006.01)
*B29B 7/00* (2006.01)
*B60J 10/12* (2006.01)

(52) U.S. Cl. ............... 296/216.09; 264/245; 264/255; 264/328.7; 264/328.8

(58) Field of Classification Search ............... 296/146.1, 296/146.2, 292.1, 216.09, 216, 146.15; 264/245, 264/255, 328.7, 328.8; 428/292.1

See application file for complete search history.

(56) References Cited

U.S. PATENT DOCUMENTS

| | | | | |
|---|---|---|---|---|
| 4,004,388 A | * | 1/1977 | Stefanik | 52/204.593 |
| 5,853,895 A | | 12/1998 | Lewno | 428/425.6 |
| 5,992,928 A | * | 11/1999 | Kato et al. | 296/216.09 |
| 2004/0036315 A1 | * | 2/2004 | Watanabe et al. | 296/146.5 |

FOREIGN PATENT DOCUMENTS

| | | |
|---|---|---|
| JP | 2001-064470 | 3/2001 |
| JP | 2001-323214 | 11/2001 |
| JP | 2003-320548 | 11/2003 |

* cited by examiner

*Primary Examiner*—D. Lawrence Tarazano
*Assistant Examiner*—Camie S Thompson
(74) *Attorney, Agent, or Firm*—Wenderoth, Lind & Ponack, L.L.P.

(57) ABSTRACT

A window structure in which a metal frame is firmly bonded to a sheet material comprising an aromatic polycarbonate resin and which has wet heat resistance and a window member for the structure are provided. The sheet window member comprises:

A: a sheet material (A) comprising an aromatic polycarbonate resin,
B: a frame member (B) laminated along the periphery of one surface of the sheet material (A), and
C: a rubber-like buffer layer (C) formed on the surface of the frame member (B), wherein the frame member (B) is formed from a resin composition comprising the following (i) to (iii):
(i) 50 to 90 parts by weight of aromatic polycarbonate resin (B-1),
(ii) 10 to 50 parts by weight of polyethylene terephthalate resin (B-2), and
(iii) 0 to 50 parts by weight of fibrous filler (B-3) based on 100 parts by weight of the total of (B-1) and (B-2).

18 Claims, 1 Drawing Sheet

SHEET-FORM WINDOW MEMBER AND WINDOW STRUCTURE

TECHNICAL FIELD

The present invention relates to a window member which makes it possible to more firmly bond a sheet material comprising an aromatic polycarbonate resin to a member having a lower linear expansion coefficient than that of the resin, e.g., a metal frame, by a rubber-like buffer layer and, particularly, improve the wet heat resistance of the bonding. By the window member, there is provided an integrated member in which a sheet material comprising an aromatic polycarbonate resin (sheet material comprising a transparent aromatic polycarbonate resin, in particular) is very firmly bonded to a metal frame and which hardly undergoes deterioration of the bonding. Further, the present invention also relates to a window structure using the window member.

BACKGROUND ART

A sheet material comprising an aromatic polycarbonate resin is widely used in a variety of industrial fields (such as fields of building materials and automobile parts) due to its excellent properties including dimensional stability, impact strength and transparency. Heretofore, the sheet material has often been fixed to another material by a method comprising binding a portion of the sheet material such as bolting. In this case, the other material to which the sheet material is fixed is generally a member having a lower linear expansion coefficient than that of the aromatic polycarbonate resin, e.g., metal, concrete and wood. Accordingly, there is a problem that stress concentration occurs in the vicinity of the binding points of the fixed sheet material due to a difference in dimensional change occurring along with a change in the temperature of the surrounding. The stress concentration causes a breakage in the vicinity of the binding point when it is severe.

As a solution for the problem, it has been attempted to reduce a dimensional change caused by temperature by addition of a filler to the aromatic polycarbonate resin. However, in order to obtain a sufficiently low thermal expansion coefficient by the method, various characteristic properties expected of the aromatic polycarbonate resin are often sacrificed. Thus, it is difficult to say that the method is a general-purpose method. The method is not an appropriate method especially in applications in which transparency is required. In recent years, a large-size sheet material is strongly demanded, and the above problem of stress concentration caused by a difference in thermal expansion coefficient tends to become more serious.

As a method for solving such a problem, a method which comprises binding a molded article formed from a thermoplastic resin composition to other member over a wide area by use of a rubber adhesive as a buffer layer is already well known.

Meanwhile, an attempt to shift from large-size transparent members (large-size transparent sheet materials) such as glazing materials which have heretofore been made of glass to lightweight transparent plastic sheets is vigorously made in recent years, especially in the field of glazing materials for vehicles. As the transparent plastic, aromatic polycarbonate resins are primarily tested from the viewpoints of transparency, strength and heat resistance. A problem in the attempt is a method for fixing the plastic sheet to a frame for vehicle. As described above, a fixing method such as bolting cannot be said to be highly appropriate from the viewpoint of stress concentration.

In the field of glass glazings for vehicles, a direct glazing method is already well known. The problem of stress concentration hardly occurs in the direct grading method. In the direct grading, a method using a specific two-component urethane adhesive is known (refer to disclosure of U.S. Pat. No. 5,853,895). An example of the adhesive is BETAMATE (trademark, product of Dow Automotive) which is commercially sold and known. It is also known that BETAMATE is a one-component or two-component urethane or epoxy adhesive system and can be used for adhesions of LEXAN (trademark, aromatic polycarbonate resin of General Electric Company) and of XENOY (trademark, polymer alloy resin of General Electric Company comprising an aromatic polycarbonate and a polybutylene terephthalate). A specific primer composition for enhancing the adhesion of an urethane sealant to a non-porous substrate such as glass or silicone hard coated resin glass is known (refer to JP-A 2001-064470 (the term "JP-A" as used herein means an "unexamined published Japanese patent application") and JP-A 2001-323214).

However, mere application of the direct glazing method to an aromatic polycarbonate resin sheet sometimes fails to provide a member such as metal to which an aromatic polycarbonate resin sheet is bonded nicely, and the wet heat resistance of the adhesive force in particular still needs to be improved.

DISCLOSURE OF THE INVENTION

Problems to be Solved by the Invention

An object of the present invention is to provide a member for firmly bonding a sheet material comprising an aromatic polycarbonate resin to a member (such as metal) having a lower thermal expansion coefficient than that of the sheet material, the member being particularly excellent in the wet heat resistance of the adhesive force.

To achieve the object, the present inventors have made intensive studies. As a result, they have surprisingly found that a member formed from a resin composition comprising an aromatic polycarbonate resin and a polyethylene terephthalate resin in a specific ratio has excellent wet heat resistance in adhesion to a rubber-like buffer layer. The finding was completely unexpected in consideration of a fact that the wet heat resistance of the member in itself formed from the composition is equal to or lower than that of a member formed from an aromatic polycarbonate resin or the like alone. Further, the present inventors have made further intensive studies and have found that a member formed from a resin composition which further contains a fibrous filler such as glass fibers in particular shows better long-term properties. Thus, the present inventors have completed the present invention which can achieve the above object.

Means for Solving the Problems

According to the present invention, the above object of the present invention can be achieved by a sheet window member comprising:

A: a sheet material (A) comprising an aromatic polycarbonate resin,

B: a frame member (B) laminated along the periphery of one surface of the sheet material (A), and C: a rubber-like buffer layer (C) formed on the surface of the frame member (B), wherein the frame member (B) is formed from a resin composition comprising the following (i) to (iii):

(i) 50 to 90 parts by weight of aromatic polycarbonate resin (B-1),
(ii) 10 to 50 parts by weight of polyethylene terephthalate resin (B-2), and
(iii) 0 to 50 parts by weight of fibrous filler (B-3) based on 100 parts by weight of the total of the (B-1) and the (B-2).

Further, according to the present invention, a window structure is provided that comprises a metal frame laminated on the rubber-like buffer layer (C) of the above sheet window member. That is, a sheet window member composing said window structure is provided.

Further, according to the present invention, a resin composition for forming the frame member (B) which comprises the above (i) to (iii) is provided. Further, according to the present invention, use of (or a method of using) a resin composition comprising the above (i) to (iii) as the frame member (B) in the sheet window member comprising the above A to C is provided.

According to the present invention, there are obtained a window structure formed by firmly bonding a sheet material comprising an aromatic polycarbonate resin to a metal frame showing smaller thermal expansion than the sheet material and a window member for the structure. The window structure of the present invention shows not only strong bonding between the metal frame and the sheet material but also excellent wet heat resistance of the bonding.

BEST MODE FOR CARRYING OUT THE INVENTION

Hereinafter, the window member and window structure of the present invention will be described in more detail. As described above, the window member of the present invention comprises A: the sheet material, B: the frame member, and C: the rubber-like buffer layer. By a combination of these components, the window structure in which the sheet material A and a metal frame are firmly bonded to each other and which can maintain stable properties over a long time is eventually obtained. Firstly, the resin composition forming the frame member (B) in the window member will be described.

(1) About the Resin Composition of the Frame Member (B) and the Structure of the Frame Member As described above, the resin composition forming the frame member (B) comprises (i) the aromatic polycarbonate resin (B-1), (ii) the polyethylene terephthalate resin (B-2), and (iii) the fibrous filler (B-3) as required. Hereinafter, these components (B-1), (B-2) and (B-3) will be described, followed by a description of the structure of the frame member.

(i) Aromatic Polycarbonate Resin (B-1):

The aromatic polycarbonate resin (hereinafter may be simply referred to as "polycarbonate resin") which is the component B-1 is obtained by reacting a dihydric phenol with a carbonate precursor. Illustrative examples of reaction methods include interfacial polymerization, melt transesterification, solid-phase transesterification of carbonate prepolymer, and ring-opening polymerization of cyclic carbonate compound. The polycarbonate resin is known per se. For example, a polycarbonate resin described in JP-A 2002-129027 can be used.

As the polycarbonate resin of the present invention, a homopolymer of a dihydric phenol (including hydroquinone and resorcinol) or a copolymer of two or more dihydric phenols can be selected.

Of various polycarbonate resins, a homopolymer of a bis (4-hydroxyphenyl)alkane such as bisphenol A and a copolymer of two or more dihydric phenols selected from 1,1-bis(4-hydroxyphenyl)-3,3,5-trimethylcyclohexane, a bis(4-hydroxyphenyl)alkane (such as bisphenol A), 2,2-bis{(4-hydroxy-3-methyl)phenyl}propane, α, α'-bis(4-hydroxyphenyl)-m-diisopropylbenzene and 9,9-bis(4-hydroxy-3-methylphenyl)fluorene are preferably used as the component B-1, and a homopolymer of bisphenol A is particularly preferred.

A polycarbonate resin which is the homopolymer of bisphenol A is rational because it has excellent impact resistance and is generally used. Meanwhile, the copolymer is excellent in view of high heat resistance or low water absorption. Production methods and properties of the copolymer resins are described in detail in, for example, JP-A 6-172508, JP-A 8-27370, JP-A 2001-55435 and JP-A 2002-117580.

As the carbonate precursor, carbonyl halide, carbonic diester, haloformate or the like is used. Specific examples thereof include phosgene, diphenyl carbonate, and dihaloformate of dihydric phenol.

In producing the polycarbonate resin from the above dihydric phenol and carbonate precursor by a polymerization method, a catalyst, a terminal blocking agent, an antioxidant for preventing oxidation of the dihydric phenol and the like may be used as required. Further, the polycarbonate resin in the present invention includes a branched polycarbonate resin copolymerized with a polyfunctional aromatic compound having three or more functional groups, a polyester carbonate resin copolymerized with an aromatic or aliphatic (including alicyclics) bifunctional carboxylic acid, a copolycarbonate resin copolymerized with a bifunctional alcohol (including alicyclics), and a polyester carbonate resin copolymerized with a bifunctional carboxylic acid and a bifunctional alcohol. These polycarbonate resins are also known. Further, the polycarbonate resin in the present invention may be a mixture of two or more of the obtained polycarbonate resins.

Details of various reaction forms are also well known by known literatures and patent publications.

The molecular weight of the polycarbonate resin is not limited. However, when the molecular weight is lower than 10,000, strength and the like deteriorate, while when it is higher than 50,000, moldability deteriorates. Thus, it is preferably 10,000 to 50,000, more preferably 15,000 to 40,000, much more preferably 18,000 to 30,000, in terms of viscosity average molecular weight. Further, two or more polycarbonate resins may be mixed together. In this case, it is certainly possible to mix together aromatic polycarbonate resins whose viscosity average molecular weight is out of the above range.

When two or more polycarbonate resins having different molecular weights are mixed together, a mixture of polycarbonate resins whose viscosity average molecular weight is higher than 50,000, preferably higher than 80,000, is preferred. It is because the mixture shows high entropy elasticity and is therefore advantageous when gas assisted molding or the like is used together. In addition, it also exhibits properties derived from the high entropy elasticity (e.g., a drip preventing property, a drawdown property, and properties which improve melt properties such as jetting improvement).

The viscosity average molecular weight (M) of the polycarbonate resin is determined by substituting specific viscosity ($\eta_{sp}$) determined at 20° C. from a solution prepared by dissolving 0.7 g of the polycarbonate resin in 100 ml of methylene chloride into the following formula:

$\eta_{sp}/c=[\eta]+0.45\times[\eta]^2 c$ ([η] is intrinsic viscosity)

$[\eta]=1.23\times10^{-4} M^{0.83}$ $c=0.7$ (ii) Polyethylene Terephthalate Resin (B-2):

The polyethylene terephthalate resin (hereinafter may be simply referred to as "PET resin") which is the component (B-2) is a polyester resin whose main recurring unit is ethylene terephthalate and which comprises at least 85 mol % of terephthalic acid component as a dicarboxylic acid component and at least 85 mol % of ethylene glycol as a diol component. The PET resin preferably comprises at least 90 mol % of terephthalic acid component as a dicarboxylic acid component.

Illustrative examples of other dicarboxylic acid components in the PET resin include isophthalic acid, 2-chloroterephthalic acid, 2,5-dichloroterephthalic acid, 2-methylterephthalic acid, 4,4-stilbenedicarboxylic acid, 4,4-biphenyldicarboxylic acid, orthophthalic acid, 2,6-naphthalenedicarboxylic acid, 2,7-naphthalenedicarboxylic acid, bisbenzoic acid, bis(p-carboxyphenyl)methane, anthracenedicarboxylic acid, 4,4-diphenyl ether dicarboxylic acid, 4,4-diphenoxyethanedicarboxylic acid, 5-sodium sulfoisophthalate, and ethylene-bis-p-benzoic acid. These dicarboxylic acids can be used alone or in admixture of two or more.

Further, in addition to the above aromatic dicarboxylic acids, the PET resin may be copolymerized with aliphatic dicarboxylic acid components. Illustrative examples of the aliphatic dicarboxylic acid components include adipic acid, sebacic acid, azelaic acid, dodecanedioic acid, 1,3-cyclohexanedicarboxylic acid, and 1,4-cyclohexanedicarboxylic acid.

Illustrative examples of other diol components in the PET resin include diethylene glycol, 1,2-propylene glycol, 1,3-propanediol, 2,2-dimethyl-1,3-propanediol, 2,2,4,4-tetramethyl-1,3-cyclobutanediol, 1,4-butanediol, neopentyl glycol, 1,5-pentanediol, 1,6-hexanediol, 1,4-cyclohexane dimethanol, 1,3-cyclohexane dimethanol, decamethylene glycol, cyclohexanediol, p-xylenediol, and bisphenol A. These may be used alone or in admixture of two or more. Further, a PET resin copolymerized with a slight amount of a polyalkylene glycol as a diol component can also be used. The molecular weight of the polyalkylene glycol preferably ranges from 150 to 6,000.

A PET resin or a combination of two or more PET resins can be used in the component B-2.

As the PET resin in the component B-2, a polyester resin containing no other copolymerizable components and produced substantially from only a terephthalic acid component and an ethylene glycol component of above compositions is particularly preferred. However, the polyester resin generally contains at least about 0.5 mol % of diethylene glycol component as a side reaction product at the time of polymerization out of 100 mol % of diol component. Accordingly, a suitable PET resin in the component B-2 may contain a small amount of a diethylene glycol component. The diethylene glycol component preferably constitutes 6 mol % or less, more preferably 5 mol % or less, much more preferably 4 mol % or less, out of 100 mol % of diol component.

The PET resin in the component B-2 is contained in an amount of not less than 85 wt %, more preferably not less than 90 wt %, out of 100 wt % of the component B-2. The component B-2 may contain an aromatic polyester resin other than the above PET resin in an amount of not more than 15 wt %, more preferably not more than 5 wt %. A particularly preferred component B-2 is an aromatic polyester resin which substantially comprises the PET resin.

Illustrative examples of an aromatic dicarboxylic acid in the aromatic polyester resin other than the PET resin include terephthalic acid and the above other dicarboxylic acid components in the PET resin. Illustrative examples of a diol component in the above aromatic polyester resin include ethylene glycol and the above other diol components in the PET resin (including a polyalkylene glycol). Specific examples of the aromatic polyester resin include a polypropylene terephthalate, polybutylene terephthalate (PBT), polyhexylene terephthalate, polyethylene isophthalate, polyethylene naphthalate (PEN), polybutylene naphthalate (PBN), polyethylene-1,2-bis(phenoxy)ethane-4,4'-dicarboxylate, and copolyesters such as a polyethylene isophthalate/terephthalate, polybutylene terephthalate/isophthalate, polyethylene/neopentyl terephthalate, and cyclohexane dimethanol copolyethylene terephthalate.

The molecular weight of the above PET resin and various aromatic polyester resins other than the PET resin preferably ranges from 0.5 to 1.5 dl/g, more preferably from 0.6 to 1.2 dl/g, in terms of intrinsic viscosity measured at 35° C. using o-chlorophenol as a solvent. Further, the amount of the terminal carboxyl groups of the aromatic polyester resin in the component B-2 is not particularly limited.

The above various aromatic polyester resins for the component B-2 can be produced by conventionally known production methods. More specifically, they are produced by a direct esterification method comprising reacting a dicarboxylic acid with a diol directly to distill out water for esterification and then carrying out polycondensation under reduced pressure or a transesterification method comprising reacting dimethyl dicarboxylate with a diol to distill out methyl alcohol for transesterification and then carrying out polycondensation under reduced pressure. Further, solid-phase polymerization can be carried out to increase intrinsic viscosity.

A catalyst and a stabilizer are preferably used at the time of the above transesterification reaction or esterification reaction and polycondensation reaction. Illustrative examples of transesterification catalysts include an Mg compound, an Mn compound, a Ca compound, a Zn compound, and acetates, monocarboxylates, alcoholates and oxides thereof. Meanwhile, although the esterification reaction can be carried out only with a dicarboxylic acid and a diol without addition of a catalyst, it can also be carried out in the presence of the following polycondensation catalysts.

As the polycondensation catalyst, a Ge compound, a Ti compound, an Sb compound or the like can be used. Specific examples thereof include germanium dioxide, germanium hydroxide, germanium alcoholate, titanium tetrabutoxide, titanium tetraisopropoxide, and titanium oxalate. As the stabilizer, a phosphorus compound is preferably used. Illustrative examples of preferred phosphorus compounds include phosphoric acid and esters thereof, phosphorous acid and esters thereof, and hypophosphorous acid and esters thereof. Further, at the time of esterification reaction, a tertiary amine such as triethylamine, a quaternary ammonium hydroxide such as tetraethylammonium hydroxide, and a basic compound such as sodium carbonate can be added to inhibit by-production of diethylene glycol. Further, to a polyester resin obtained, various stabilizers and modifiers can be added.

(iii) Fibrous Filler (B-3)

The fibrous filler which is the component B-3 binds the sheet material (A) comprising an aromatic polycarbonate resin more firmly and inhibits deformation caused by thermal expansion of the sheet material (A). Meanwhile, slight deterioration in wet heat resistance in bonding to the rubber-like buffer layer (C) is recognized in the frame member containing the fibrous filler. Hence, although preferred embodiments vary depending on which of these properties is emphasized, it is preferred to contain the fibrous filler in a relatively small amount, in view of overall balance among the properties.

The fibrous filler contained in the frame member (B) is apt to be oriented parallel to the bonding interface between the sheet material (A) and the frame member (B) and the bonding interface between the frame member (B) and the rubber-like buffer layer (C). Therefore, peeling force on these bonding interfaces occurs in a direction different from an orientation direction in which a fibrous filler or a plate filler is supposed to exhibit a reinforcing effect. The orientation may be one of causes for the slight deterioration of wet heat resistance. However, as compared with a plate filler, the fibrous filler B-3 is advantageous from the viewpoint of strength in the direction in which the peeling force occurs (direction different from the orientation direction). Further, from the viewpoint, strong bonding between the fibrous filler (B-3) and the matrix resins (B-1 and B-2) is important, and it is preferred that the bonding show better wet heat resistance.

The fibrous filler component B-3 may be any fibrous or needle like filler whose L/D (fiber length/fiber diameter) is larger than 1, preferably 2 or larger. Thus, it includes artificially produced fillers and crushed natural minerals. It may be one having a certain distribution although having nearly uniform fiber diameters. Further, the shape of a cross section thereof is not particularly limited. The shape of the cross section may be circular as well as non-circular, e.g., elliptical, cocoon-shaped or trifoliate.

Specific examples of the fibrous filler component B-3 include glass fibers, carbon fibers, metal fibers, ceramic fibers, milled fibers thereof, slag fibers, rock wools, wollastonite, xonotlite, potassium titanate whiskers, aluminum borate whiskers, boron whiskers, and basic magnesium sulfate whiskers. Further, the fibers may be coated with different materials, as exemplified by metal-coated glass fibers and metal-coated carbon fibers. Of these, the glass fibers, carbon fibers and milled fibers thereof are advantageous from the viewpoint of strength. In particular, the glass fibers and milled fibers thereof are advantageous because stronger adhesion to a resin matrix comprising the component B-1 and the component B-2 is achieved. The glass fibers are particularly preferred.

The glass fibers are known per se to one skilled in the art and available from a number of manufacturers. The glass fibers as the component B-3 are not particularly limited in glass composition such as A glass, C glass or E glass and may contain such components as $TiO_2$, $SO_3$ and $P_2O_5$ in some cases. However, E glass (non-alkali glass) is more preferred.

Further, the average fiber diameter of the glass fibers is not particularly limited but is generally 1 to 25 µm, preferably 3 to 17 µm. Glass fibers having an average fiber diameter within this range are good in achieving a balance between a thermal expansion coefficient and resistance to peeling force. As the fiber diameter decreases, the area of the interface between the glass fiber and the resin matrix increases, so that the efficiency of control of the thermal expansion coefficient becomes good, but an undesirable influence exerted on the peeling force by the interface increases. When the adhesion of the interface is prioritized, use of glass fibers with larger fiber diameters can be one measure.

A preferable fiber length of the glass fibers is 50 to 1,000 µm, preferably 100 to 500 µm, particularly preferably 120 to 300 µm, in terms of number average fiber length, in a resin composition pellet or the frame member (molded article). The number average fiber length is a value calculated by an image analyzer based on observation under an optical microscope of a glass fiber residue collected after dissolving the frame member (molded article) in a solvent or decomposing the resin with a basic compound. Further, in calculation of the value, fibers whose lengths are smaller than or equal to the corresponding fiber diameters are not counted. A number average fiber diameter of not larger than 1,000 µm is appropriate for other fibrous fillers as well.

The fibrous filler component B-3 is preferably surface-treated with a silane coupling agent or the like so as to achieve stronger adhesion to the above resin matrix comprising the components B-1 and B-2. A reactive group in the silane coupling agent may be an epoxy group, an amino group, a vinyl group or a methacryloxy group, and the epoxy group and the amino group are particularly preferred. Further, glass fibers and carbon fibers are generally subjected to surface coating to bind the fibers. The adhesion to the resin matrix is largely influenced by a surface coating agent. To achieve strong bonding, particularly bonding showing good wet heat resistance, between the component B-3 and the resin matrix in the present invention, a surface coating agent comprising an epoxy-group-containing compound is preferred. The epoxy-group-containing compound is highly reactive with the resin matrix comprising the components B-1 and B-2 and shows good adhesion to the resin matrix, and the adhesion shows excellent wet heat resistance. Further, the epoxy-group-containing compound is effective in accelerating crystallization of the PET resin. Consequently, a frame member B having a stable dimensional change and capable of adhesion with good wet heat resistance is obtained.

As the surface treating agent for the component B-3, various epoxy-group-containing compounds can be used. The epoxy-group-containing compounds preferably have a polymer structure having a molecular weight of not lower than 500 and more preferably also contain a plurality of epoxy groups in a molecule. Further, a structure which primarily comprises an aromatic ring is preferred from the viewpoint of heat resistance.

More specifically, as the epoxy-group-containing compound, epoxy resins, particularly a phenol novolak type epoxy resin and a linear cresol novolak type epoxy resin are suitable. The phenol novolak type epoxy resin is particularly suitable. That is, an epoxy-group-containing compound which primarily comprises the phenol novolak type epoxy resin and/or the linear cresol novolak type epoxy resin is preferred as the epoxy-group-containing compound. That is, an epoxy-group-containing compound which comprises the phenol novolak type epoxy resin and/or the linear cresol novolak type epoxy resin in an amount of not lower than 70 wt %, preferably not lower than 80 wt %, more preferably not lower than 90 wt %, out of 100 wt % of the epoxy-group-containing compound is preferred.

Further, the amount of the surface coating agent on the fibrous filler component B-3 is preferably 0.1 to 2 wt %, more preferably 0.5 to 1.5 wt %, further preferably 0.6 to 1.2 wt %, out of 100 wt % of the fibrous filler. When the amount thereof is smaller than 0.1 wt %, binding of the fibers is not satisfactory, so that the amount of cotton fly produced is liable to increase. Meanwhile, when it is larger than 2 wt %, the binding agent may degrade the properties of the resin composition, while adhesion is saturated.

The fibrous filler component B-3 more preferably satisfies, as a characteristic thereof, an amount of produced cotton fly of not larger than 10 g when 200 g of 3-mm-length chopped strands of fiber reinforcement are charged into a 1-liter beaker and agitated at 2,000 rpm by an agitator at 23° C. for 5 minutes. The term "cotton fly" as used herein refers to chopped strands which are originally bound but opened by the agitation. As the agitator, one capable of indicating the number of revolutions and of feedback control to a set number of revolutions is used. As for blades of the agitator, three-blade marine type having a diameter of 50 mmφ is used. The amount of produced cotton fly is preferably 5 g or less, more preferably 3 g or less, most preferably 1 g or less.

A fibrous filler which produces a large amount of cotton fly is liable to have a problem that it cannot be fed into a melt kneader stably because of the cotton fly. Further, such a fibrous filler is not taken into the melt kneader satisfactorily due to low bulk density and is also liable to have a problem such as back-flow. These problems induce irregular accumulation of the resin in the melt kneader, resulting in thermal degradation of the resin. Inhibition of the thermal degradation is important particularly when resins which react in the melt kneader are used as in a transesterification reaction in a polymer alloy of the aromatic polycarbonate resin (B-1) and the aromatic polyester resin (B-2).

Further, a fibrous filler with a controlled amount of produced cotton fly is less liable to cause a blockage in a transportation pipe due to the occurrence of cotton fly during transportation and to undergo a breakage at the time of melt kneading of the resins and the fibrous filler due to the occurrence of a large amount of cotton fly, whereby desired properties including rigidity and a thermal expansion coefficient are developed easily. Therefore, such a fibrous filler is preferred.

To satisfy the above characteristic of the amount of produced cotton fly, an epoxy-containing compound and a surface coating agent comprising a component such as a polyurethane, polyacrylate or polyamide are preferably used in combination as a surface coating agent therefor. A combination of the epoxy-containing compound and the polyurethane is more preferred. Accordingly, a suitable surface coating agent in the present invention is one which comprises a phenol novolak type epoxy resin and/or a linear cresol novolak type epoxy resin as a main component(s) and further comprises a polyurethane. The content of the phenol novolak type epoxy resin and/or the linear cresol novolak type epoxy resin is preferably 50 to 95 wt %, more preferably 60 to 90 wt %, out of 100 wt % of the surface coating agent. A surface coating agent containing a phenol novolak type epoxy resin in an amount of not lower than 50 wt %, preferably not lower than 60 wt %, out of 100 wt % of binder component is particularly preferred.

When the fibrous filler is to be coated with the surface coating agent, it is preferable that the fibrous filler be surface-treated with an amino silane coupling agent or epoxy silane coupling agent first and then treated with a phenol novolak type epoxy resin and/or a linear cresol novolak type epoxy resin and a polyurethane. Further, a binding agent for the fibrous filler generally comprises a component which imparts slipperiness and an emulsifying agent in addition to a component which substantially binds the fibrous filler together (i.e., the above surface coating agent) It is a matter of course that the various components can be contained in the binding agent. An emulsion solution containing these various components is applied and dried, whereby components which are primarily the surface coating agent remain on the fibrous filler. In the drying and heat treatment steps, an increase in the molecular weight of the surface coating agent is promoted, whereby a sufficient surface coating agent is formed. Further, to apply the phenol novolak type epoxy resin and/or the linear cresol novolak type epoxy resin and the polyurethane, a method of applying a mixture of emulsions thereof to the fibrous filler is basically used. However, a method of applying them separately can also be used.

Excellent effects such as strength, a thermal expansion coefficient and wet heat resistance can be achieved by reducing the amount of produced cotton fly as described above.

(iv) Composition Ratio of Resin Composition

The resin composition which forms the frame member (B) substantially comprises the component B-1, the component B-2 and the component B-3 which is a suitable component.

As for the composition ratio of the component B-1 and the component B-2 in this resin composition, the amount of the component B-1 is 50 to 90 parts by weight, preferably 70 to 88 parts by weight, more preferably 75 to 85 parts by weight, and the amount of the component B-2 is 10 to 50 parts by weight, preferably 12 to 30 parts by weight, more preferably 15 to 25 parts by weight, based on 100 parts by weight of the total of the component B-1 and the component B-2. When the amount of the component B-2 is smaller than 10 parts by weight based on 100 parts by weight of the total of the component B-1 and the component B-2, wet heat resistance of bonding is liable to become unsatisfactory, while when the amount of the component B-2 is larger than 50 parts by weight, the wet heat resistance and strength of the bonding and the dimensional stability of a molded article become unsatisfactory. In both cases, good adhesion cannot be obtained.

Meanwhile, the composition ratio of the component B-3 is such that the amount of the component B-3 is 0 to 50 parts by weight, preferably 1 to 50 parts by weight, more preferably 1 to 30 parts by weight, much more preferably 1 to 15 parts by weight, particularly preferably 1.5 to 7 parts by weight, based on 100 parts by weight of the total of the component B-1 and the component B-2. As described above, by containing the fibrous filler (B-3) in a relatively small amount, a better balance between an improvement in wet heat resistance and inhibition of warpage can be achieved.

(v) Additional Components in the Resin Composition and Preparation of the Composition The resin composition which forms the frame member (B) may further contain other thermoplastic resins (such as a styrene resin, polyamide resin, polyacetal resin, polyphenylene ether resin, polymethyl methacrylate resin, polyethylene resin, polypropylene resin, polyvinyl chloride resin, polyvinylidene chloride resin, chlorinated ethylene resin, polyvinylidene fluoride resin, and polyphenylene sulfide), impact modifiers, flame retardants (such as a brominated epoxy, brominated polystyrene, brominated polycarbonate, brominated polyacrylate, triphenyl phosphate, phosphate oligomer, phosphonic acid amide, and silicone based flame retardant), flame retardant aids (such as sodium antimonate and antimony trioxide), dripping inhibiters (such as a polytetrafluoroethylene having a fibril forming capability), melt elasticity improving materials (such as acrylic resins and fluorocarbon resins having a molecular weight of not lower than 2,000,000), nuclear agents (such as sodium stearate and ethylene-sodium acrylate), heat stabilizers, antioxidants (such as hindered phenol compounds and sulfur compounds), ultraviolet absorbers, light stabilizers, mold releasing agents, lubricants, colorants (such as dyes, pigments, and carbon black), fluorescent brighteners, luminous pigments, fluorescent dyes, flow modifiers, inorganic and organic antibacterial agents, photocatalyst based stain-proofing agents, infrared absorbers and photochromic agents, in amounts that do not impair the objects of the present invention. In particular, it is preferred that the resin composition contain a phosphate compound as a heat stabilizer, and it is also preferred that the composition contain carbon black from the viewpoints of weather resistance and a masking effect. Details of the above additives will be described later.

For preparation of the resin composition, any method can be employed. For example, a method can be employed that comprises premixing the component B-1, the component B-2, and other components as required together and then melt-kneading and pelletizing the mixture. Means for the premixing may be a Nautor mixer, a V-shaped blender, a Henschel mixer, a mechanochemical machine or an extruding mixer. In the premixing, granulation can be carried out by an extruding granulator, a briquetting machine or the like as required. After the premixing, the obtained mixture is melt-kneaded by a melt kneader typified by a vented twin-screw extruder and pelletized by a device such as a pelletizer. The melt kneader may also be a Banbury mixer, a kneading roll or a thermostatic agitator, but the vented twin-screw extruder is preferred.

Alternatively, a method can also be used that comprises feeding the components into a melt kneader typified by a twin-screw extruder separately without premixing them. In addition, a method can also be used that comprises premixing some of the components together and then feeding the resulting mixture into a melt kneader separately from the rest of the components. Particularly, when the component B-3 is added to the frame member (B), it is preferably fed from a feed port situated in the middle of an extruder into the molten resins by means of a feeder such as a side feeder. Means for the premixing and granulation are the same as described above. Further, when the components to be kneaded include liquid components, a so-called liquid injector or liquid feeder can be used to feed the liquid components to a melt kneader.

Further, when the resin composition is prepared, the component B-1 and the component B-2 preferably contain little water before melt-kneading. Thus, it is more preferred that the component B-1 and the component B-2 be melt-kneaded after either or both of them are dried by a method such as hot-air drying, microwave drying or vacuum drying. Meanwhile, vent suction during melt kneading is preferably conducted under a moderately reduced pressure. More preferred is a method of carrying out the vent suction around atmospheric pressure. Further, a method comprising discharging volatile components out of the system while circulating a nitrogen gas can also be used.

(vi) About Structure of Frame Member (B)

The frame member (B) in the present invention is formed of the above resin composition. Although it is satisfactory that the frame member (B) is bonded to a portion of the periphery of one surface of the sheet material (A), it is more suitable that the frame member (B) is bonded to the whole periphery of the sheet material (A). That is, a more preferred embodiment of the frame member (B) is an one-piece molded frame capable of bonding to the periphery of the sheet material (A). The stronger binding force the sheet material (A) is subjected to, the more effectively the characteristics of the resin composition are exhibited. Further, it is preferred that the frame member (B) be bonded to 10 to 90% of the area of the sheet material (A). The contact area is more preferably 20 to 80%, much more preferably 30 to 70%.

Further, although the frame member (B) can be bonded to one surface, both surfaces or multiple surfaces of the sheet material (A), it is more preferably bonded to one surface of the sheet material (A). This is because a primary purpose of the frame member (B) is to enhance bonding between the sheet material (A) and the rubber-like buffer layer (C) and therefore a structure that the frame member (B) is laminated between the rubber-like buffer layer (C) and the sheet material (A) accomplishes the purpose and the structure is aesthetically advantageous as well. On the other hand, with the bonding style, when the frame member (B) and the sheet material (A) are bonded together by two-color injection molding or insert molding which is a suitable embodiment of the present invention, warpage is liable to occur throughout the resulting molded article. However, the resin composition of the frame member (B) has an advantage that such warpage hardly occurs.

The thickness ratio (A/B) of the sheet material (A) to the frame member (B) preferably ranges from 0.1 to 10, more preferably from 0.5 to 5, much more preferably from 0.8 to 4. Further, the absolute value of the thickness of the frame member (B) preferably ranges from 0.1 to 10 mm, more preferably from 0.5 to 5 mm, much more preferably 1 to 3 mm. The ratio and thickness of the above ranges give sufficient binding force against warpage caused by thermal expansion of the sheet material (A) and consequently impart better long-term properties to the resin composition of the frame member.

Although it is satisfactory that at least a portion of the frame member (B) is bonded to the rubber-like buffer layer (C), preferably at least 5%, more preferably at least 15% of the area of the bonding surface of the frame member (B) is covered with the rubber-like buffer layer (C). The upper limit of the area is properly about 80%. This is because a primary purpose of the frame member (B) is to enhance bonding between the sheet material (A) and the rubber-like buffer layer (C). The area of the surface of the frame member (B) must be determined in view of a minimum required area of the bonding surface and a margin taking into account protrusion of the rubber-like buffer layer (C) (when the appearance is not negligible).

The frame member (B) can be molded of resin compositions by various production methods. Specific examples of the production methods include injection molding, extrusion, compression molding, blow molding and rotational molding. Injection molding is particularly preferred. Further, the molded article may be further subjected to secondary processing.

(2) Sheet Material (A)

The sheet material (A) of the present invention is a sheet-like molded article of an aromatic polycarbonate resin and suitably has a-thickness of 1 to 10 mm, preferably 2 to 7 mm. The aromatic polycarbonate resin of the sheet material (A) refers to aromatic polycarbonate resins described as the component B-1 of the above frame member (B) and resin compositions obtained by adding various other resins, impact modifiers, reinforcements and additives to the resins. More specifically, it is a resin composition which constitutes the sheet material (A) and comprises an aromatic polycarbonate resin as an organic component in an amount of at least 50 wt %. More preferably, the sheet material (A) comprises the aromatic polycarbonate resin as the organic component in an amount of at least 95 wt %. The aromatic polycarbonate resin of the sheet material (A) does not need to be the same as the resin of the above component B-1. Further, its viscosity average molecular weight is preferably 10,000 to 50,000, more preferably 15,000 to 40,000, much more preferably 20,000 to 35,000.

Further, an embodiment of the polycarbonate resin of the sheet material (A) is as follows. That is, an aromatic polycarbonate (hereinafter may be referred to as "high-molecular-weight-component-containing aromatic polycarbonate") can also be used that comprises a blend of an aromatic polycarbonate (PC-i) having a viscosity average molecular weight of 70,000 to 300,000 and an aromatic polycarbonate (PC-ii) having aviscosityaveragemolecularweight of 10,000 to 30,000 and has a viscosity average molecular weight of 15,000 to 40,000, suitably 20,000 to 30,000.

The high-molecular-weight-component-containing aromatic polycarbonate has improved entropy elasticity of the polymer due to the presence of PC-i and is more advantageous in injection press molding which is suitably used in the case of large-size molded articles. For example, appearance defects such as hesitation marks can be further reduced, and the range of conditions for injection press molding can be expanded accordingly. Meanwhile, the PC-ii component, a low-molecular-weight component, reduces the melt viscosity of the whole polymer and promotes relaxation of the resin, thereby making molding with less distortion possible. The same effect is observed in a polycarbonate resin containing a branched component.

The sheet material (A) can be subjected to surface modification so as to be provided with other functions. The surface modification is means for forming a new layer on the surface layer of the resin molded article, e.g., vapor deposition (physical vapor deposition, chemical vapor deposition or the like), plating (electroplating, electroless plating, hot plating or the like), painting, coating and printing, and means which is used for ordinary resin molded articles can be employed. For example, various surface treatments such as decorative coating, hard coating, water-repelling and oil-repelling coatings, ultraviolet absorbing coating, infrared absorbing coating and metallizing (plating, vapor deposition, sputtering or the like) can be carried out. Of these, hard coating is particularly suitable in the present invention.

The aromatic polycarbonate resin of the sheet material (A) can contain various additives. It preferably contains an ultraviolet absorber, a heat stabilizer, an antioxidant and a mold releasing agent in particular and can further contain a heat-ray absorber, a colorant and a light diffuser. Various colorants and light diffusers can provide vehicle glazings of various designs.

The sheet material (A) can be produced by molding the aromatic polycarbonate resin by various methods. Specific examples of the production methods include injection molding, extrusion, compression molding, blow molding and rotational molding. Injection molding is particularly preferred. Further, the molded article may be further subjected to secondary processing. That is, the sheet material (A) is not limited to a flat shape and may take various shapes obtained by deforming a flat sheet, e.g., a curved shape (for example, a surface thereof which is not bonded to the frame member may take a convex shape). Further, it may be a three-dimensional object formed by the sheet material. Although the sheet material (A) does not necessarily have to have a uniform thickness, it is practical and preferable that it have nearly uniform thickness.

Illustrative examples of a hard coating agent used for hard coating on the surface of the sheet material (A) include a silicone resin based hard coating agent and an organic resin based hard coating agent. The silicone resin based hard coating agent forms a cured resin layer having a siloxane bond and is exemplified by a partial hydrolysis condensate of a compound composed essentially of a compound (such as a trialkoxysilane compound) corresponding to a trifunctional siloxane unit, preferably a partial hydrolysis condensate which further contains a compound (such as a tetraalkoxysilane compound) corresponding to a tetrafunctional siloxane unit, and partial hydrolysis condensates obtained by filling the above condensates with metal oxide fine particles such as colloidal silica. The silicone resin based hard coating agent may also contain a bifunctional siloxane unit and a monofunctional siloxane unit. Although they contain an alcohol (in the case of a partial hydrolysis condensate of an alkoxysilane) which is produced at the time of condensation reaction and the like, they may be further dissolved or dispersed in a given organic solvent, water or a mixture thereof as required. Illustrative examples of the organic solvent therefor include lower fatty acid alcohols, and polyhydric alcohols and ethers and esters thereof. To the hard coat layer, various surfactants such as a siloxane based surfactant and an alkyl fluoride based surfactant may be added to obtain a flat and smooth surface condition.

Illustrative examples of the organic resin based hard coating agent include melamine resins, urethane resins, alkyd resins, acrylic resins and polyfunctional acrylic resins. Illustrative examples of the polyfunctional acrylic resins include resins such as a polyol acrylate, polyester acrylate, urethane acrylate, epoxy acrylate and phosphazene acrylate.

Of these hard coating agents, a silicone resin based hard coating agent showing excellent long-term durability and relatively high surface hardness or an ultraviolet curing acrylic resin or polyfunctional acrylic resin requiring a relatively simple treatment and capable of forming a good hard coat layer is preferred. In particular, it is preferred that at least a surface of the product (window structure) which is exposed to sunlight would be covered with the silicone resin based hard coating agent. As the silicone resin based hard coating agent, a so-called two coat type constituted by a primer layer and a top layer or a so-called one coat type formed by only a single layer can be selected.

Illustrative examples of a resin which forms the primer layer (first layer) include urethane resins comprising various block isocyanate components and polyol components, acrylic resins, polyester resins, epoxy resins, melamine resins and amino resins and various polyfunctional acrylic resins such as a polyester acrylate, urethane acrylate, epoxy acrylate, phosphazene acrylate, melamine acrylate and amino acrylate. These can be used alone or in combination of two or more. Of these, a primer layer comprising the acrylic resin or the polyfunctional acrylic resin in an amount of preferably not lower than 50 wt %, more preferably not lower than 60 wt % is preferred, and a primer layer comprising the acrylic resin and the urethane acrylate is particularly preferred. To form primer layers comprising these resins, a method comprising applying an unreacted resin and then causing the resin to undergo a given reaction to be cured or a method comprising directly applying a reacted resin to form a cured resin layer can be employed. In general, in the latter method, the resin is dissolved in a solvent to prepare a solution, the solution is applied, and then the solvent is removed. Further, in the former method as well, a solvent is generally used.

Further, the resin which forms the hard coat layer may contain various additives and addition aids such as light stabilizers, ultraviolet absorbers, catalysts, thermal polymerization and photopolymerization initiators, polymerization inhibitors, antifoaming agents, leveling agents, thickeners, anti-settling agents, anti-sagging agents, flame retardants, and organic and inorganic pigments and dyes.

As a coating method, such a method as bar coating, dip coating, flow coating, spray coating, spin coating or roller coating can be selected as appropriate according to the shape of a molded article which serves as a substrate to be coated. When the frame member (B) is bonded to the sheet material (A) after the surface of the sheet material (A) is hard-coated, it is appropriate to be careful not to have a bonding portion between the sheet material (A) hard-coated and the frame member (B). When it is completely hard-coated, sufficient bonding force cannot be obtained, thereby making it difficult to firmly bond the frame member (B) to the sheet material (A). A portion of the bonding portion may be hard-coated, but care must be taken so that sufficient bonding can be attained. To obtain a member comprising the frame member (B) and the sheet material (A) bonded together easily, it is preferred that hard coating be performed after integration of the components is completed. After the integration, care must be taken so that the hard coating agent does not stick to an area on the frame member (B) to which the rubber-like buffer layer (C) is bonded. A masking treatment therefor or a hard coating treatment avoiding the area can be carried out relatively easily.

(C) About Rubber-Like Buffer Layer (C)

The rubber-like buffer layer (C) used in the present invention preferably comprises a resin composition showing a Young's modulus of 100 MPa or lower after completion of a crosslinking reaction (curing) of a rubber adhesive which is the buffer layer. The Young's modulus preferably ranges from 0.5 to 50 MPa, more preferably from 1 to 20 MPa. Further, the rubber-like buffer layer (C) in the present invention has a tensile breaking elongation of preferably 30% or higher, more preferably 50% or higher, much more preferably 80% or higher, in the rubber adhesive after completion of the crosslinking reaction. An appropriate upper limit of the tensile breaking elongation is 800% or lower, preferably 500% or lower. A suitable rubber-like buffer layer (C) has a breaking strength in the rubber adhesive after completion of the reaction of 3 to 70 MPa, suitably 5 to 60 MPa. The above Young's modulus can be calculated based on ASTM D-797. The lap shear strength of the rubber adhesive is preferably 1 to 7 MPa, more preferably 4 to 6 MPa. The shear strength can be calculated based on ASTM D-1002. The Shore hardness of the rubber adhesive as the buffer layer is preferably 45 to 67, more preferably 47 to 65.

The rubber resin composition of the rubber-like buffer layer (C) in the present invention is suitably formed from an urethane based adhesive. This is because the urethane based adhesive is excellent in strength, fatigue characteristics and heat aging resistance as an elastic body. As the urethane based rubber adhesive, a moisture curing one-component urethane adhesive and a two-component urethane adhesive can be used. However, from the viewpoints of high strength, a low cost and a high curing rate (which refers to both a set rate and a cure rate), the two-component urethane adhesive is preferred. Particularly, the high curing rate is advantageous in bonding of the frame member (B) which is lightweight as compared with glass or the like or a member comprising the frame member (B) and a metal frame. This is because they show weaker pressure bonding by self-weight than glass and the like and may therefore require a pressurization process.

The two-component urethane adhesive which is a suitable rubber adhesive will be further described. The two-component urethane adhesive comprises an isocyanate component and a polyol component. When these components are mixed in a proper ratio at the time of use, they undergo a curing reaction and form a rubber polyurethane.

Illustrative examples of the above isocyanate component include diphenyl methane diisocyanate (MDI; including 4,4'-MDI, 2,4'-MDI, 2,2'-MDI and mixtures thereof), tolylene diisocyanate (TDI; including 2,4-TDI, 2,6-TDI and a mixture thereof), carbodide modified diphenyl methane diisocyanate, phenyl methane diisocyanate, xylylene diisocyanate, hexamethylene diisocyanate, dicyclohexyl methane diisocyanate, isophorone diisocyanate, hexahydroxylylene diisocyanate, and mixtures thereof. Further, a terminal isocyanate group containing urethane prepolymer produced by reacting the above excess isocyanate compound with a polyol component is named as a suitable example of the isocyanate component. In addition, the isocyanate component may be a mixture of the urethane prepolymer and the above isocyanate compound. Of the above isocyanate compounds, MDI and TDI are particularly suitable, and MDI is particularly preferred. Therefore, a terminal isocyanate group containing urethane prepolymer obtained by reacting excess MDI with a polyol component and a mixture of the prepolymer and MDI are particularly suitable as the isocyanate component. The isocyanate equivalent (molecular weight per isocyanate group) of the isocyanate component preferably ranges from 140 to 600, more preferably from 140 to 200. Further, the isocyanate component may further comprise a polyfunctional isocyanate group containing compound having two or more functional groups.

Illustrative examples of the polyol component in the two-component urethane adhesive include various polyol components such as diols, triols, tetraols, pentaols, hexaols, heptaols and octaols. Specific examples thereof include ethylene glycol, propylene glycol, diethylene glycol, dipropylene glycol, 1,3-butanediol, 1,4-butanediol, 4,4'-dihydroxydiphenyl methane, glycerin, 1,2,6-hexanetriol, 1,1,1-trimethylolpropane, pentaerythritol, dipentaerythritol, hexaglycerin, decaglycerin, sorbitol and sucrose. Specific examples of the polyol component further include polymer polyols such as polyether polyols (e.g., poly(alkyleneoxide)glycols such as a poly(ethyleneoxide)glycol, poly(propyleneoxide)glycol and poly(butyleneoxide)glycol), polyester polyols and polybutadiene polyols. Of these, the polyether polyol is suitable as the polyol component, and its hydroxyl value (molecular weight per hydroxyl group) preferably ranges from 50 to 2,000.

To achieve a high curing rate, either the isocyanate component or the polyol component preferably contains a curing catalyst. Because a particularly suitable isocyanate component is a terminal isocyanate group containing urethane prepolymer and because the component acts as a base and the polyol component acts as a curing agent, the curing catalyst is suitably contained in the polyol component. Illustrative examples of the catalyst include tertiary amine compounds such as N-alkyl morpholine and N-alkyl piperazine, and heavy metal organic compounds such as dibutyltin laurate and tin octoate. Concurrent use of the tertiary amine compound and the heavy metal organic compound is suitable. Specific examples of the tertiary amine compounds further include 1,4-diazabicyclo[2,2,2]octane, N-methyl morpholine, N-ethyl morpholine, triethylamine, N-methyl diethanolamine, N,N-dimethylaminoethanol, N,N-diethylaminoethanol, triethanolamine, tetramethylguanidine, N,N,N',N'-tetramethylethylenediamine, N,N-dimethyl(C10 to C16 alkyl)amine, N,N-dimethylcyclohexylamine, N,N-dimethylpiperazine, 1,2,4-trimethylpiperazine, bis-(2-hydroxypropyl)-2-methylpiperazine, and bis-(β-dimethylaminoethyl) ether. The amount of the curing catalyst is preferably 0.01 to 5 wt %, more preferably 0.03 to 3 wt %, based on a mixture of the isocyanate component (base) and the polyol component (curing agent).

In the polyol component, an organic polyvalent amine compound can be contained in addition to the above catalyst so as to obtain a higher curing rate and bonding strength. Illustrative examples of the organic polyvalent amine compound include (poly)alkylene polyamines such as ethylene diamine, diethylene triamine, triethylene tetramine, tetraethylene pentamine, hexamethylene diamine, propylene diamine and dipropylene diamine, and aromatic polyamines such as phenylene diamine, m-xylylene diamine, tolylene diamines (such as 2,4-/2,6-tolylene diamine and 2,3-/3,4-tolylene diamine), diaminodiphenylmethanes such as diaminodiphenylmethane, diaminodimethyldiphenylmethane and diaminodiethyldiphenylmethane, and polymethylene polyphenyl polyamines. Illustrative examples of the organic polyvalent amine compound further include amine compounds obtained by substituting hydroxyl groups of sucrose with an amino group and amine compounds obtained by substituting hydroxyl groups of pentaerythritol with an amino group. The amine compound obtained by substitution of the alcoholic hydroxyl group with the amino group is produced by a known method (for example, a method comprising carrying out a reaction with ammonia after halogenation). An organic polyvalent amine compound containing no aromatic ring more preferably contains at least three amino groups and has a ratio of amino groups to carbon atoms of 0.25 to 1. An organic polyvalent amine compound containing an aromatic ring satisfactorily contains at least two amino groups. The organic polyvalent amine compound is contained in the polyol component in an amount of preferably not higher than 20 wt %, more preferably 2 to 20 wt %, much more preferably 5 to 10 wt %.

The ratio of moles of isocyanate groups to moles of hydroxyl groups and amino groups in the above two-component urethane adhesive is preferably about 0.9 to 2.0, more preferably 1.03 to 1.4, much more preferably 1.1 to 1.3.

The rubber-like buffer layer (C) can suitably contain an inorganic filler. By addition of the inorganic filler, a stronger and better buffer layer is formed. The proportion of the inorganic filler preferably ranges from 10 to 50 wt % out of 100 wt % of the total amount of the buffer layer (C). The proportion of the inorganic filler in a more suitable two-component urethane adhesive preferably ranges from 10 to 50 wt %, more preferably from 15 to 30 wt %, much more preferably from 20 to 30 wt %, out of 100 wt % of the total of the isocyanate component and the polyol component. The inorganic filler may be contained in either or both of the isocyanate component and the polyol component. However, since the suitable proportion is relatively large, the inorganic filler is preferably contained in both components. That is, the isocyanate component and the polyol component each preferably contain the inorganic filler in an amount of preferably 10 to 50 wt %, more preferably 15 to 30 wt %, much more preferably 20 to 30 wt %, out of 100 wt %. Illustrative examples of the inorganic filler contained in the rubber-like buffer layer (C) include calcium carbonate, perlite, clay, talc, mica, barium sulfate, zeolite, diatomaceous earth, glass and silica. Talc and mica are preferred. Of micas, muscovite is preferred.

Further, the rubber-like buffer layer (C) formed representatively by the above two-component urethane adhesive can suitably contain a plasticizer. Illustrative examples of the plasticizer include aromatic carboxylic acid esters such as dioctyl phthalate, dibutyl phthalate, diheptyl phthalate, diisononyl phthalate, butyl benzyl phthalate, trioctyl trimellitate and triisodecyl trimellitate, aliphatic carboxylic acid esters such as dioctyl adipate, diisodecyl adipate, octyl decyl adipate, dioctyl azelate and dioctyl sebacate, and phosphates such as tricresyl phosphate. The proportion of the plasticizer is preferably not higher than 20 wt %, more preferably 1 to 15 wt %, out of 100 wt % of the total amount of the adhesive. In the case of a more suitable two-component urethane adhesive in the present invention, the isocyanate component and the polyol component contain the plasticizer in an amount of preferably not higher than 20 wt %, more preferably 1 to 15 wt %, out of 100 wt % of the total of each component, much more preferably 2 to 13 wt %, out of 100 wt % of the total of the two components. The plasticizer may be contained in either or both of the isocyanate component and the polyol component.

Further, the rubber-like buffer layer (C) can suitably contain an ultraviolet absorber, an ultraviolet stabilizer, an ultraviolet shielding agent and the like. Illustrative examples of these agents include organic ultraviolet absorbers such as benzotriazole based ultraviolet absorbers, benzophenone based ultraviolet absorbers, triazine based ultraviolet absorbers and cyclic imino ester based ultraviolet absorbers, organic light stabilizers (radical trapping agents) such as hindered amine based light stabilizers, photocatalyst based light stabilizers (including fillers having surfaces modified with the components) such as titanium oxide, cerium oxide and zinc oxide, and ultraviolet shielding agents such as carbon black. In particular, carbon black is suitably contained. By the effect of the shielding component itself and synergy of the shielding component and other stabilizing component, the durability of the rubber-like buffer layer (C) can be improved significantly.

In addition to the above ultraviolet absorber, the rubber-like buffer layer (C) in the present invention can also contain, as other optional components, a molecular chain extender, a crosslinking agent, a pigment, a colorant, a diluent, a moisture absorbent, a thixotropy imparting agent, a heat stabilizer, a leveling agent, an antifoaming agent and a catalyst (in the cases other than the two-component urethane adhesive as well).

Illustrative examples of the above molecular chain extender in a more suitable two-component urethane adhesive in the present invention include ethylene glycol, butanediol, ethylenediamine and diethyl toluene diamine. Illustrative examples of the crosslinking agent include sucrose oxypropionate, aliphatic amines, pentaerythritol, various polyols whose hydroxyl groups have been substituted with amino groups, various polyols containing amino groups, 1,2,6-hexanetriol, 1,1,3-trimethylpropane and glycerin. An example of the moisture absorbent is synthetic zeolite.

A specific example of a suitable two-component urethane adhesive is BETAMATE 2810 (trade name, a combination of agent A and agent B/S) of DOW AUTOMOTIVE.

The thickness of the rubber-like buffer layer (C) is not particularly limited but is preferably 2 to 10 mm, more preferably 2.5 to 9 mm, much more preferably 3 to 8 mm, so as to achieve better adhesion and buffer action. The thickness is the thickness of the rubber-like buffer layer (C) after completion of the reaction. When the above thickness is too large, the absolute amount of elongation of the layer becomes large, so that fixation of the member may become unsatisfactory or displacement (creep) with time may become large. Meanwhile, when the above thickness is too small, the durability of the layer is apt to become unsatisfactory, and peeling of the layer from the interface may occur.

A suitable range for the thickness of the rubber-like buffer layer (C) depends on the size, i.e., maximum length, of the sheet material (A). When the maximum length of the sheet material exceeds 1 m, the thickness of the rubber-like buffer layer (C) is advantageously 2 to 8 mm, particularly advantageously 3 to 7 mm, per m of the maximum length of the sheet material (A).

When the adhesive is applied to form the rubber-like buffer layer (C), the surfaces of the members subjected to bonding must be fully cleaned. Although it will be described later, at least either, more suitably both of the members to which the rubber adhesive which forms the rubber-like buffer layer (C) is applied are preferably treated with a primer to have a good adhesive layer. The adhesive is applied in accordance with a coating method of each adhesive. The two-component urethane adhesive is applied in a state in which the two components are uniformly mixed in an accurate mixing ratio by use of various metering devices and mixers. Illustrative examples of the metering devices include a gear pump type metering device and a plunger type metering device. Illustrative examples of the mixers include a static mixer and a mechanical mixer with a mixing head. These may have a temperature controller for more stable application. To accelerate setting and curing after application of the adhesive, the members bonded by the adhesive may be subjected to a heat treatment. Illustrative examples of the heat treatment include induction heating, infrared heating, microwave heating, and heating with a heating medium such as hot air.

(4) About Metal Frame

A window structure is formed by attaching a metal frame on the rubber-like buffer layer (C) in the sheet window frame member of the present invention.

The metal frame in the window structure is not particularly limited, and various ferrous materials and nonferrous materials can be used. Illustrative examples thereof include a steel material (steel plate), an aluminum alloy, a magnesium alloy and a titanium alloy. Of these, the steel material and the aluminum alloy are suitable. The surfaces of the metal frame, even a surface thereof to which the rubber-like buffer layer (C) is bonded, may have a coating film of other material. In general, a steel material (steel plate, in particular) often has surfaces treated in a certain manner. Therefore, as the metal frame, a hot-dipped steel material, an electroplated steel material and a coated steel material can be used, for example.

Further, a suitable embodiment of the metal frame is frames of vehicle glazings. Illustrative examples of the vehicle glazings include glazings in rear windows, rear (tail) gates, sliding roofs, sliding doors, lifting (gull-wing) doors, lifting rear gates, side windows, hingedwindows, sunroofs, androofs (including detachable roofs such as targa tops and foldaway roofs such as convertible tops).

(5) About Primer

In the present invention, a primer is very preferably applied on the surface of the frame member (B) so that the performance of the above the rubber-like buffer layer (C) is fully exhibited.

The sheet material (A) is securely bonded to the metal frame by having a primer between the frame member (B) and the rubber-like buffer layer (C). That is, the frame member (B) and the rubber-like buffer layer (C) are preferably bonded to each other via the primer layer. A suitable example of the primer is an acrylic primer. The acrylic primer comprises, as a main component, a (meth)acrylate polymer containing a (meth)acrylate monomer in an amount of at least 50 wt %, more preferably at least 70 wt %, much more preferably at least 90 wt %. The primer contains solvents and other additives. The (meth)acrylate monomer includes general alkyl (meth)acrylate monomers, aryl (meth)acrylate monomers, and (meth)acrylate monomers containing various functional groups. Illustrative examples of the (meth)acrylate monomers containing functional groups include 2-hydroxyethyl (meth)acrylate, 2-hydroxypropyl (meth)acrylate, amide (meth)acrylate, glycidyl(meth)acrylate, γ-(meth)acryloxypropyl trimethoxysilane, and 2-(2'-hydroxy-5-(meth)acryloxyethylphenyl)-2H-benzotriazole.

The above (meth)acrylate polymer preferably contains methyl methacrylate as an essential component. Further, the (meth)acrylate polymer is more suitably a methacrylate copolymer comprising methyl methacrylate and an alkyl (meth)acrylate having 2 to 6 carbon atoms as essential components, much more suitably a methacrylate copolymer comprising methyl methacrylate and butyl (meth)acrylate as essential components, particularly suitably a methacrylate copolymer comprising methyl methacrylate and butyl acrylate as essential components.

The weight average molecular weight of the above (meth) acrylate polymer preferably ranges from 1,000 to 10,000,000, more preferably from 2,000 to 200,000, much more preferably 5,000 to 100,000. The weight average molecular weight is calculated as a value in terms of polystyrene by GPC (Gel Permeation Chromatography) measurement using a calibration curve prepared from a standard polystyrene.

Further, in the above methacrylate copolymer, the weight ratio of methyl methacrylate to the alkyl (meth)acrylate having 2 to 6 carbon atoms (methyl methacrylate: alkyl (meth) acrylate having 2 to 6 carbon atoms) is preferably 90:10 to 30:70, more preferably 65:35 to 40:60.

The (meth)acrylate polymer in the above primer can also be copolymerized with monomers and oligomers copolymerizable with the (meth)acrylate monomers. Illustrative examples of the monomers include aromatic vinyl compounds such as styrene, vinyl cyanide compounds such as acrylonitrile, halogen-containing vinyl compounds such as vinylidene fluoride, olefin compounds such as ethylene, and α,β-ethylenic unsaturated acids and esters thereof such as maleic anhydride and itaconic acid.

Further, the above suitable methacrylate copolymer can also be copolymerized with other (meth)acrylate monomers. For example, the methacrylate copolymer comprising methyl methacrylate and butyl (meth)acrylate as essential components may be copolymerized with ethyl (meth)acrylate, propyl (meth)acrylate, hexyl (meth)acrylate, benzyl (meth)acrylate or 2-ethylhexyl (meth)acrylate. The term "(meth) acrylate" as used above includes both methacrylate and acrylate.

As the (meth)acrylate polymer constituting the primer, polymers polymerized by such methods as various radical polymerizations, e.g., bulk polymerization, solution polymerization and emulsion polymerization, living radical polymerization (e.g., group transfer polymerization) and anionic polymerization, and by various physical stimulations such as radiation polymerization and electron beam polymerization can be used. Further, the methacrylate copolymer may be in the form of a random copolymer, block copolymer or graft copolymer. Further, the primer may also contain a crosslinking agent having three or more functional groups.

The primer preferably contains a polyester polyurethane and/or an isocyanate compound so as to achieve strong adhesion to the urethane adhesive. The isocyanate compound is exemplified by various isocyanate compounds described above with respect to the two-component urethane adhesive. Of the above described isocyanate compounds, MDI, particularly 4,4'-MDI, is preferred.

The primer can also contain an epoxy resin. The epoxy resin may be any polyepoxy compound having two or more epoxy groups in a molecule. Illustrative examples of the epoxy resin include a glycidyl ether type epoxy resin of bisphenol A and derivatives thereof, a glycidyl ether type epoxy resin of glycerin, a glycidyl ether type epoxy resin of polyalkylene oxide, a glycidyl ether type epoxy resin of phenol novolak, a glycidyl ether type epoxy resin of dimer acid, and a glycidyl ether type epoxy resin of bisphenol F. Of these, the glycidyl ether type epoxy resin of bisphenol A is particularly suitable. The content of the epoxy resin is properly 25 wt % or lower in organic components of the primer.

The above suitable methacrylate copolymer has a good affinity for the urethane based adhesive of the rubber-like buffer layer (C) and for the resin composition of the frame member (B). As a result, the bonded members have very good peel strength. In particular, a primer containing a polyester polyurethane and/or an isocyanate compound, particularly a primer containing an isocyanate compound, achieves strong bonding. Meanwhile, one of factors with respect to the peel strength is the degree of penetration of the methacrylate copolymer at the interface between the frame member (B) and the layer (C). The degree of the intrusion is influenced by the type of solvent used. When the composition of the frame member (B) to which the primer is applied is too sensitive to chemical attack by the solvent, cracks may occur at the time of application or the long-term properties of the buffer layer (C) may deteriorate due to small differences in molding conditions. In this regard, the resin composition of the frame member (B) of the present invention has reduced sensitivity to chemical attack by a solvent and allows stable adhesion even for a solvent having relatively strong penetrating force.

As the solvent in the primer, a solvent having moderate volatility and penetrating force against the resin composition of the frame member (B) is preferred. Illustrative examples of such a solvent include methyl ethyl ketone, methyl isobutyl ketone, acetone, ethyl acetate, butyl acetate, cellosolve acetate, mineral spirits, gasoline, toluene, xylene, dimethyl acetamide, n-hexane, tetrahydrofuran, ethyl ether, and dioxane. Of these, methyl ethyl ketone is suitable. The content of the solvent preferably ranges from 100 to 500 parts by weight, more preferably 120 to 400 parts by weight, based on 100 parts by weight of the above (meth)acrylate polymer constituting the primer.

Further, the primer in the present invention can also contain various components addable in the above rubber adhesive.

A specific example of the suitable acrylic primer is BETAPRIME 5404 (trade name) of DOW AUTOMOTIVE.

Further, the surface of the frame member (B) and the surface of the metal frame are preferably cleaned prior to application of the primer or application of the adhesive for forming the buffer layer (C), and isopropanol or the like is suitably used for the cleaning. A specific example of a more suitable surface cleaner is BETACLEAN 3350 (trade name) of DOW AUTOMOTIVE.

(6) About Properties of Window Structure

In the present invention, there is provided a window structure having the sheet material (A), the frame member (B), the rubber-like buffer layer (C) and the metal frame laminated in the order presented.

The window structure is excellent in the wet heat resistance of its adhesive force in particular. More specifically, the wet heat resistance of the adhesive force can satisfy "Peel strength between the frame member (B) and the rubber-like buffer layer (C) is higher than the cohesive failure strength of the buffer layer (C) after the frame member (B) to which the rubber-like buffer layer (C) is bonded is treated at 70° C. and a relative humidity of 98% for 200 hours." Further, the cohesive failure strength is preferably 10 MPa or higher, more preferably 15 MPa or higher. Its upper limit is 70 MPa, preferably 60 MPa.

(7) About Production Method of Window Structure

Next, production methods of the window structure of the present invention will be described. In its production, five steps, that is, (a) a step of preparing the sheet material (A) (step a), (b) a step of preparing the frame member (B) (step b), (c) a step of bonding the sheet material (A) and the frame member (B) together to integrate them (step c), (d) a step of forming the rubber-like buffer layer (c) on the surface portion of the frame member (B) of the thus integrated members (including a step of applying a primer in advance when the primer is used) (step d), and (e) a step of bonding the metal frame to the formed rubber-like buffer layer (C) to obtain the window structure (step e) exist as basic steps, and various methods differing in the order of the steps, a combination of the steps and other optional steps and the order of the steps and the optional steps exist. For example, the following production method-i to-production method-3 can be presented.

Production Method-1: The above steps a to e are carried out in the order presented. However, the step a and the step b may be carried out simultaneously or in reverse order.

Production Method-2: After the above step a, the step b and the step c are carried out simultaneously, and then the step d and the step e are carried out in this order. Specific examples of the method comprising carrying out the step b and the step c simultaneously include insert molding and two-color injection molding. An example of the insert molding is a method comprising inserting a separately obtained sheet material (A) into a mold and molding a frame member (B) to integrate them. An example of the two-color injection molding is a method comprising molding a sheet material (A), inverting or moving a mold with the molded article retained therein and molding a frame member (B) to integrate them. The insert molding and the two-color injection molding are preferred production methods capable of integrating the frame member (B) and the sheet material (A) efficiently and firmly. The two-color injection molding is particularly preferred.

Production Method-3: Unlike the above production method-2, after the step b, the step a and the step c are carried out simultaneously (insert molding and two-color injection molding are named as specific methods), and the step d and the step e are carried out in this order.

In addition, an optional step other than the above steps a to e is (f) a step of cleaning a surface on which the adhesive of the rubber-like buffer layer (C) or the primer is applied (step f) by use of a cleaner. The step f is suitably carried out prior to at least either one of the step d and the step e. In particular, the step f is particularly suitably carried out prior to each of the steps d and e. Further, a heat treatment step (step g) intended for complete curing of the adhesive is suitably added after the step e.

Further, suitable examples of optional steps other than the above steps a to g include (h) a step of forming a hard coat layer on the surface of the sheet material (A) (step h) and (i) a step of forming a functional layer other than the hard coat layer on the sheet material (A) (step i). Although the step h and the step i can be carried out in any order as long as they are carried out after the step a, they are preferably carried out after the step d. Further, when both the step h and the step i are included, the order of these steps is not particularly limited. Further, when the hard coat layer and the functional layer are formed on the same surface, they may be laminated or situated parallel to each other without laminated portions. Illustrative examples of the functional layer include a pattern layer, an electrical conductive layer (heat generating layer, electromagnetic wave absorbing layer and antistatic layer), water-repelling and oil-repelling layers, a hydrophilic layer, an ultraviolet absorbing layer, an infrared absorbing layer, a cracking preventing layer, and a metal layer (metallizing layer). The functional layers can be formed by such methods as printing.

(8) Optional Additives into Resins of Sheet Material (A) and Frame Member (B)

As described above, various optional additives can be added to the resin composition constituting the frame member (B) and the aromatic polycarbonate resin constituting the sheet material (A) (hereinafter may be simply referred to as "resin composition" in this section). The additives will be described in detail hereinafter.

The resin composition can contain an impact modifier. The impact modifier comprises a rubber elastic material. The rubber elastic material refers to a polymer resulting from copolymerization of a rubber component having a glass transition temperature of not higher than 10° C., preferably not higher than –10° C., more preferably not higher than –30° C., with a monomer component copolymerizable with the rubber component. Illustrative examples of the rubber component include diene rubber, butyl rubber, acrylic rubber, olefin rubber and silicone rubber, and various rubbers resulting from copolymerization of these components or inter-penetrating networking of these components. Suitable examples of the monomer component copolymerized with the rubber component include aromatic vinyl compounds, vinyl cyanide compounds, (meth)acrylate compounds, and (meth)acrylic compounds. In addition, epoxy-group-containing methacrylate, a maleimide based monomer, an α,β-unsaturated carboxylic acid or an anhydride thereof can be contained as the copolymerizable component.

More specific examples thereof include an MB (methyl methacrylate-butadiene) polymer, an MA (methyl methacrylate-acrylic rubber) polymer, a methyl methacrylate-alkyl acrylate-butadiene copolymer, a methyl methacrylate-alkyl acrylate-acrylic rubber copolymer, a methyl methacrylate-acrylic-butadiene rubber copolymer, and a methyl methacrylate-(acrylic.silicone IPN rubber) polymer. Other elastic polymers include various thermoplastic elastomers such as an olefinic thermoplastic elastomer, a polyurethane based thermoplastic elastomer, a polyester based thermoplastic elastomer and a polyamide based thermoplastic elastomer. The rubber elastic materials can be used alone or in combination of two or more. The content of the rubber elastic material in the aromatic polycarbonate resin constituting the sheet material (A) is properly not higher than 25 wt %, preferably 1 to 15 wt %, more preferably 1.5 to 8 wt %, out of 100 wt % of the resin composition. The content of the rubber elastic material in the resin composition constituting the frame member (B) is preferably 1 to 15 wt %, more preferably 1.5 to 8 wt %.

The aromatic polycarbonate resin preferably contains various heat stabilizers and antioxidants since it is particularly suitable for products to be used under high temperature conditions. Illustrative examples of the heat stabilizers and antioxidants include stabilizers comprising phosphorus compounds. Preferred examples thereof include phosphite compounds, phosphonite compounds and phosphate compounds.

Specific examples of the phosphate compounds include tris(diethylphenyl)phosphite, tris(di-iso-propylphenyl)phosphite, tris(di-n-butylphenyl)phosphite, tris(2,4-di-t-butylphenyl)phosphite, tris(2,6-di-t-butylphenyl)phosphite, tris(2,6-di-t-butylphenyl)phosphite, distearyl pentaerythritol diphosphite, bis(2,4-di-t-butylphenyl)pentaerythritol diphosphite, bis(2,6-di-t-butyl-4-methylphenyl)pentaerythritol diphosphite, phenyl bisphenol A pentaerythritol diphosphite, and dicyclohexyl pentaerythritol diphosphite.

Further, other phosphite compounds which react with dihydric phenols and have a cyclic structure can also be used. Specific examples thereof include 2,2'-methylenebis(4,6-di-t-butylphenyl)(2,4-di-t-butylphenyl)phosphite, 2,2'-methylenebis(4,6-di-t-butylphenyl)(2-t-butyl-4-methylphenyl) phosphite, 2,2'-methylenebis(4-methyl-6-t-butylphenyl)(2-t-butyl-4-methylphenyl)phosphite, and 2,2'-ethylidenebis(4-methyl-6-t-butylphenyl)(2-t-butyl-4-methylphenyl) phosphite.

Specific examples of the phosphate compounds include tributyl phosphate, trimethyl phosphate, tricresyl phosphate, triphenyl phosphate, trichlorophenyl phosphate, triethyl phosphate, diphenyl cresyl phosphate, diphenyl monoorthoxenyl phosphate, tributoxyethyl phosphate, dibutyl phosphate, dioctyl phosphate, and diisopropyl phosphate. Triphenyl phosphate and trimethyl phosphate are preferred.

Specific examples of the phosphonite compounds include tetrakis(2,4-di-t-butylphenyl)-4,4'-biphenylene diphosphonite, tetrakis(2,4-di-t-butylphenyl)-4,3'-biphenylene diphosphonite, tetrakis(2,4-di-t-butylphenyl)-3,3'-biphenylene diphosphonite, tetrakis(2,6-di-t-butylphenyl)-4,4'-biphenylene diphosphonite, tetrakis(2,6-di-t-butylphenyl)-4,3'-biphenylene diphosphonite, tetrakis(2,6-di-t-butylphenyl)-3,3'-biphenylene diphosphonite, bis(2,4-di-t-butylphenyl)-4-phenyl-phenyl phosphonite, bis(2,4-di-t-butylphenyl)-3-phenyl-phenyl phosphonite, bis(2,6-di-n-butylphenyl)-3-phenyl-phenyl phosphonite, bis(2,6-di-t-butylphenyl)-4-phenyl-phenyl phosphonite, and bis(2,6-di-t-butylphenyl)-3-phenyl-phenyl phosphonite. Tetrakis(di-t-butylphenyl) biphenylene diphosphonite and bis(di-t-butylphenyl)-phenyl-phenyl phosphonite are preferred, and tetrakis(2,4-di-t-butylphenyl)biphenylene diphosphonite and bis(2,4-di-t-butylphenyl)-phenyl-phenyl phosphonite are more preferred. The phosphonite compounds can be used and are preferably used in combination with the above phosphite compounds having an aryl group substituted with two or more alkyl groups.

As the stabilizer comprising phosphorus compounds, the phosphite compound or the phosphonite compound and the phosphate compound are preferably used in combination. Further, the content of the stabilizer comprising phosphorus compounds is preferably 0.001 to 2 wt %, more preferably 0.005 to 1 wt %, much more preferably 0.01 to 1 wt %, particularly preferably 0.01 to 0.5 wt %, out of 100 wt % of the resin composition.

Illustrative examples of other antioxidants include phenol based antioxidants, sulfur based antioxidants, and lactone based stabilizers.

Preferred specific examples of the phenol based antioxidants include octadecyl-3-(3,5-di-t-butyl-4-hydroxyphenyl) propionate, 2-t-butyl-6-(3'-t-butyl-5'-methyl-2'-hydroxybenzyl)-4-methylphenyl acrylate, 3,9-bis{2-[3-(3-t-butyl-4-hydroxy-5-methylphenyl) propionyloxy]-1,1,-dimethylethyl}-2,4,8,10-tetraoxaspiro[5,5]undecane, and pentaerythritol tetrakis[3-(3,5-di-t-butyl-4-hydroxyphenyl) propionate. Octadecyl-3-(3,5-di-t-butyl-4-hydroxyphenyl) propionate is more preferred.

Specific examples of the sulfur based antioxidants in the present invention include distearyl-3,3'-thiodipropionate, pentaerythritol tetra(β-laurylthiopropionate)ester and thiodiethylenebis[3-(3,5-di-t-butyl-4-hydroxyphenyl)propionate].

An example of the lactone based stabilizers is a reaction product of 3-hydroxy-5,7-di-t-butyl-furan-2-one and o-xylene. Details of the stabilizer are described in JP-A 7-233160.

The aromatic polycarbonate resin can also contain an ultraviolet absorber. Illustrative examples of the ultraviolet absorber include benzophenone based compounds typified by 2-hydroxy-4-n-dodecyloxybenzophenone, 2,2'-dihydroxy-4,4'-dimethoxybenzophenone and bis(5-benzoyl-4-hydroxy-2-methoxyphenyl)methane.

Illustrative examples of the ultraviolet absorber further include benzotriazole based compounds typified by 2-(2H-benzotriazol-2-yl)-p-cresol, 2-(2H-benzotriazol-2-yl)-4-(1,1,3,3-tetramethylbutyl)phenol, 2-(2H-benzotriazol-2-yl)-4,6-di-t-pentylphenol, 2-(2H-benzotriazol-2-yl)-4,6-bis(1-methyl-1-phenylethyl)phenol, 2,2'-methylenebis[4-(1,1,3,3-tetramethylbutyl)-6-(2H-benzotriazol-2-yl)phenol] and a condensate of methyl-3-[3-t-butyl-5-(2H-benzotriazol-2-yl)-4-hydroxyphenyl propionate and a polyethylene glycol.

Illustrative examples of the ultraviolet absorber further include hydroxyphenyltriazine based compounds such as 2-(4,6-diphenyl-1,3,5-triazin-2-yl)-5-hexyloxyphenol, and 2-(4,6-bis(2,4-dimethylphenyl)-1,3,5-triazin-2-yl)-5-hexyloxyphenol.

Illustrative examples of the ultraviolet absorber further include cyclic imino ester based compounds such as 2,2'-p-phenylenebis(3,1-benzoxazin-4-one), 2,2'-m-phenylenebis(3,1-benzoxazin-4-one), and 2,2'-p,p'-diphenylenebis(3,1-benzoxazin-4-one).

Illustrative examples of the ultraviolet absorber further include cyano acrylate based compounds such as 1,3-bis-[(2'-cyano-3',3'-diphenylacryloyl)oxy]-2,2-bis[(2-cyano-3,3-diphenylacryloyl)oxy]methyl)propane, and 1,3-bis-[(2-cyano-3,3-diphenylacryloyl)oxy]benzene.

Further, the aromatic polycarbonate resin can also contain a hindered amine based light stabilizer typified by bis(2,2,-6,6-tetramethyl-4-piperidyl)sebacate, bis(1,2,2,6,6-pentamethyl-4-piperidyl)sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, poly{[6-(1,1,3,3-tetramethylbutyl)amino-1,3,5-triazine-2,4-diyl][(2,2,6,6-tetramethylpiperidyl) imino]hexamethylene [(2,2,6,6-tetramethylpiperidyl) imino]} and polymethylpropyl-3-oxy-[4-(2,2,6,6-tetramethyl)pipe ridinyl]siloxane. The light stabilizer exhibits better performance with regard to weather resistance and the like when used in combination with the above ultraviolet absorber and antioxidant.

The above ultraviolet absorber and light stabilizer may be in the form of a polymer type ultraviolet absorber and/or light stabilizer resulting from copolymerization of an ultraviolet absorbing monomer and/or a light stabilizing monomer with a monomer such as an alkyl (meth)acrylate by adopting the structure of a monomer compound capable of radical polymerization. Suitable examples of the above ultraviolet absorbing monomer and light stabilizing monomer include compounds having a benzotriazole skeleton, a benzophenone skeleton, a triazine skeleton, a cyclic imino ester skeleton, a cyano acrylate skeleton and a hindered amine skeleton in the ester substituents of (meth)acrylate.

The contents of the phenol based antioxidant, sulfur based antioxidant and lactone based stabilizer are each preferably 0.001 to 2 wt %, more preferably 0.005 to 1 wt %, much more preferably 0.01 to 1 wt %, particularly preferably 0.01 to 0.5 wt %, out of 100 wt % of the resin composition.

Further, the contents of the ultraviolet absorber and light stabilizer are each preferably 0.001 to 2 wt %, more preferably 0.005 to 1 wt %, much more preferably 0.01 to 1 wt %, particularly preferably 0.01 to 0.5 wt %, out of 100 wt % of the resin composition.

The resin composition of the frame member (B) and the aromatic polycarbonate resin of the sheet material (A) in the present invention may contain a mold releasing agent. As the mold releasing agent, a known mold releasing agent can be used. Illustrative examples thereof include saturated fatty acid esters, unsaturated fatty acid esters, polyolefin based wax (e.g., polyethylene wax, an 1-alkene polymer, and wax modified with functional-group-containing compounds, e.g., acid modified wax), fluorine compounds (e.g., fluorine oil typified by polyfluoroalkyl ether), paraffin wax, and bees wax.

In particular, when the sheet material (A) comprises a transparent aromatic polycarbonate resin, a saturated fatty acid ester is suitable as the mold releasing agent. As the saturated fatty acid ester, glycerin fatty acid esters such as monoglyceride stearate, diglyceride stearate and triglyceride stearate, polyglycerin fatty acid esters such as decaglycerin decastearate and decaglycerin tetrastearate, lower fatty acid esters such as stearyl stearate, higher fatty acid esters such as behenyl sebacate, and erythritol esters such as pentaerythritol tetrastearate are used. Of these, a full ester comprising stearic acid or palmitic acid and a polyhydric alcohol (pentaerythritol in particular) is preferred. Further, the acid value of the full ester is preferably 20 or less, more preferably 4 to 20, much more preferably 5 to 15. The content of the mold releasing agent is preferably 0.001 to 2 wt %, more preferably 0.005 to 1 wt %, much more preferably 0.01 to 1 wt %, particularly preferably 0.01 to 0.5 wt %, out of 100 wt % of the resin composition.

The resin composition and the aromatic polycarbonate resin in the present invention may contain an antistatic agent in such an amount that does not impair the effect of the present invention. Illustrative examples of the antistatic agent include polyether ester amides, glycerin monostearate, ammonium dodecylbenzenesulfonate, phosphonium dodecylbenzenesulfonate, maleic anhydride monoglyceride and maleic anhydride diglyceride. The content of the antistatic agent is preferably 0.5 to 20 wt % out of 100 wt % of the resin composition.

EFFECTS OF THE INVENTION

Figure 1:
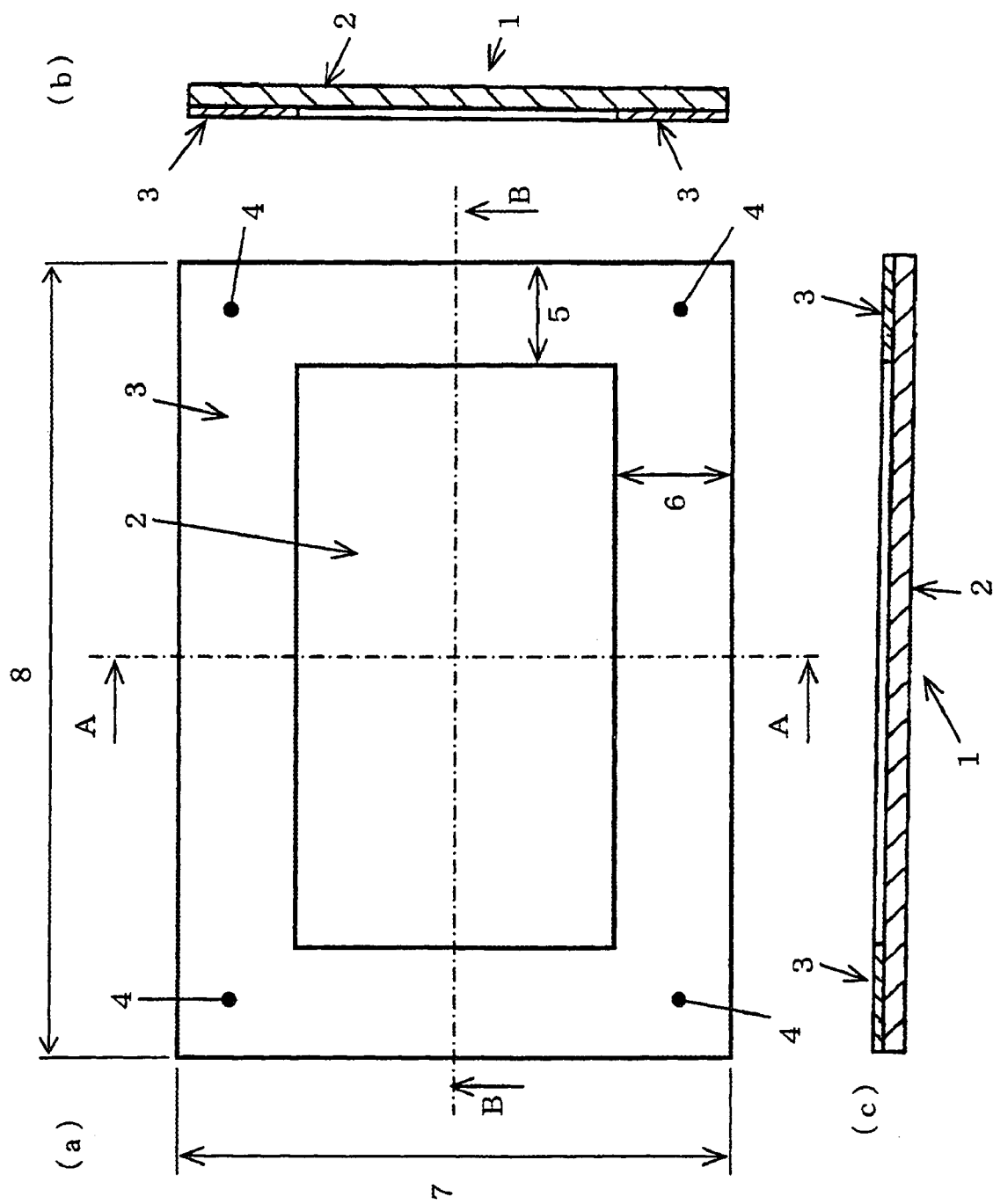
FIG. 1 shows a two-color injection molded article molded in Experiment 2 in Examples and Comparative Examples, wherein (a) is a front elevation view (view from the frame member side), (b) is a sectional view at the line A-A and (c) is a sectional view at the line B-B, and reference numeral 1 denotes a two-color injection molded article (integrally molded article of a sheet material and a frame member), 2 denotes a sheet material (molded by use of a fan gate having a thickness of 1.5 mm, thickness: 4 mm), 3 denotes a frame member (thickness: 2 mm), 4 denotes a pin gate of the frame member (four spots, diameter: 1.4 mm), 5 denotes the width in the longitudinal direction of the frame member (40 mm), 6 denotes the width in the transverse direction of the frame member (40 mm), 7 denotes the width of the molded article (200 mm), and 8 denotes the length of the molded article (300 mm).

It is obvious from the above descriptions that good bonding between a sheet material comprising an aromatic polycarbonate and a metal frame having a low linear expansion coefficient is achieved in the present invention and that the present invention is useful for a wide variety of industrial applications and is widely applied to automobile applications in particular. The present invention provides a window structure comprising a sheet material comprising a polycarbonate resin which is suitable for vehicle glazing materials, particularly rear door windows, sunroofs and roof panels. In addition to the vehicle glazing materials, the window structure of the present invention can also be used in a wide variety of applications including windows of construction machines, windows of buildings, houses and greenhouses, roofs of garages and arcades, lenses for lights, lenses for traffic signals, lenses for optical apparatuses, mirrors, glasses, goggles, sound deadening walls, windshields of motorcycles, name plates, covers or substrates for solar batteries, covers for display devices, touch panels, and parts for game systems (circuit covers, chassis, etc.), due to its unique characteristics. Therefore, the window structure of the present invention and a window member for the window structure are useful for a variety of applications including electronic and electrical apparatuses, office automation equipment, vehicle parts, machine parts, agricultural materials, fishery materials, shipping containers, packaging containers, toys, and miscellaneous goods, and their effects in the industry are remarkable.

EXAMPLES

Hereinafter, the present invention will be further described with reference to Examples. Examples 1 to 7 and Comparative Examples 1 to 5

The following components a and b were dried by a circulation type hot air dryer at 120° C. for 5 hours, and components shown in Table 1 excluding a component c were uniformly mixed together in amounts shown in Table 1 by a comb-teeth tumbler. ST-1 and ST-2 were added to the tumbler as a master agent obtained by mixing them with the component a uniformly by a super mixer such that the total of ST-1 and ST-2 became 10 wt %. The mixture prepared by the tumbler was fed from a stirring blade type feeder placed on a meter (CWF of Kubota Corporation) into a first feed port at the base of a screw of a vented twin-screw extruder (TEX30XSST of Japan Steel Works, Ltd.) having a diameter of 30 mmφ. Meanwhile, the component C was fed to a side feeder in a predetermined amount by use of a vibration type feeder placed on the meter and fed to the extruder through the side feeder. Extrusion was conducted with the cylinder and die at 280° C., a strand was produced at a screw revolution speed of 180 rpm, a discharge rate of 18 kg/hour and a vent suction degree of 10,000 Pa and then pelletized by means of a pelletizer, and the following experiments were made to confirm the effect of the present invention.

Experiment 1

After the obtained pellets were dried by a circulation type hot air dryer at 120° C. for 6 hours, a rectangular plate having a size of 150 mm×150 mm×3 mm was molded by use of an injection molding machine [T-150D of FANUC CO., LTD.] at a molding temperature of 280° C. and a mold temperature of 110° C. and conditioned at 23° C. and a relative humidity of 50% for 24 hours. The surfaces of the molded article were cleaned by use of BETACLEAN 3350 (product of DOW AUTOMOTIVE, trade name). Then, BETAPRIME 5404 (product of DOW AUTOMOTIVE, trade name) was applied as a primer. After 5 minutes, BETAMATE 2810 A agent and BETAMATE 2810 B/S agent (products of DOW AUTOMOTIVE, trade names) as a two-component urethane adhesive which contained about 25 wt % of muscovite (both the agent A and the agent B) and had a lap shear strength (in accordance with ASTM D-1002) of about 5 MPa and a Young's modulus (in accordance with ASTM D-797) of about 10 MPa were loaded into BETAGUN type 995.164 (product of DOW AUTOMOTIVE, trade name) and applied on the above primer. The primer and the adhesive were applied to a width of about 10 mm and a length of about 130 mm, respectively, and the thickness of the adhesive after completion of the reaction was about 5 mm. The molded article coated with the adhesive was stored at 23° C. and a relative humidity of 50% for 200 hours to complete the reaction of the adhesive. Thereafter, the molded article was treated at 70° C. and a relative humidity of 98% for 200 hours. After completion of the treatment, the molded article was conditioned at 23° C. and a relative humidity of 50% for 24 hours, and an adhesive peel test was carried out. The peel test was carried out by a method comprising peeling an end of the adhesive in the longitudinal direction from the molded article (by about 5 to 10 mm) by a nipper, pulling the peeled portion in the vertical direction by pliers with the plate completely fixed, and visually observing the state of breakage. When the breakage did not occur at the interface between the molded article and the adhesive but was cohesive failure of the adhesive, the operation of pulling the adhesive portion vertically by pliers in the same manner as described above was repeated until the adhesive was completely removed from the plate. The peel test was carried out with 10 test samples, and the percentage (%) of the area where the adhesive remained on the test sample to the adhesive coated area was calculated and evaluated. That is, in this evaluation, when the adhesive undergone a cohesive failure in every peel test, it was rated as 100%, while when peeling occurred at the interface and no adhesive remained on the test sample in every peel test, it was rated as 0%.

Experiment 2

In addition to the pellets of the above Examples and Comparative Examples, the following PCC-1 was prepared for molding a transparent member. After the pellets of Examples and Comparative Examples and PCC-1 pellets were dried by use of a circulation type hot air dryer at 120° C. for 6 hours, a two-color injection molded article comprising a transparent member and a frame member as shown in FIG. 1 was obtained by use of a molding machine capable of two-color injection molding (FN8000-36ATN of Nissei Plastic Industrial Co., Ltd.) (the frame member was bonded to 56% of the area of the transparent member.) Thereafter, a silicone based hard coating agent was applied on the surface of the transparent member of the two-color injection molded article which was not in contact with the frame member by flow coating in the following manner, and on the surface thereof in contact with the frame member, the same hard coating agent was applied by brush coating such that the hard coating agent did not touch the adhesive portion. As a result, a molded article having the transparent member hard-coated on both surfaces was obtained. Then, the bonding surface portion of the frame member of the molded article was cleaned in the same manner as described above, coated with a primer, and then coated with an adhesive which formed a buffer layer. After application of the adhesive, a frame of the same shape as that of the frame member which was prepared from a coated steel plate was quickly bonded to the frame member. After the bonding, the molded article was kept at 23° C. and a relative humidity of 50% for 200 hours so as to complete the reaction of the adhesive, thereby preparing a window structure comprising the polycarbonate based resins. The thickness of the adhesive which formed the buffer layer after the reaction was about 5 mm. Then, the member was kept in a cold heat cycle tester and subjected to 100 cycles of a cold heat cycle test comprising 0° C. for 1 hour and 70° C. for 1 hour. The condition of the member after the test was visually observed and evaluated based on the following criteria. The test samples of Comparative Examples 2 and 3 were not evaluated because the results of the evaluations in Experiment 1 were very poor.

◎: No warpage occurred in a molded article. (No peeling occurred.)

○: Mild warpage occurred in a molded article. (No peeling occurred.)

x : Severe warpage occurred in a molded article. (No peeling occurred.)

Experiment 3

The same experiment as Experiment 2 was conducted by use of a frame prepared from an aluminum alloy of No. 6,061 in place of the frame prepared from the coated steel plate used in Experiment 2. The Experiment 3 was conducted on window structures comprising the frame members of Examples 2, 4 and 5. As in Experiment 2, Example 2 was evaluated as ◯, and Examples 4 and 5 were evaluated as ⊚.

Experiment 4

The same experiment as Experiment 3 was conducted by changing the thickness of the adhesive as the buffer layer from about 5 mm to about 0.5 mm and 15 mm. The Experiment 4 was conducted on a window structure comprising the frame member of Example 2. A buffer layer having a thickness of about 0.5 mm was obtained by spreading a freshly applied adhesive by use of a scraper. A buffer layer having a thickness of about 15 mm was obtained by repeating application of the adhesive. In the case of a window structure having the buffer layer having a thickness of about 0.5 mm, peeled portions were seen in the above cold heat cycle test. Meanwhile, in a window structure having the buffer layer having a thickness of about 15 mm, the window member was tilted and difficult to fix parallel to the frame member and protrusion of the adhesive occurred, thereby impairing the appearance.

Descriptions of the raw materials used in the compositions of Examples and Comparative Examples, PCC-1 and the hard coating agent are as follows.

(Component a)
PC: aromatic polycarbonate resin powder (Panlite L-1225WX of TEIJIN CHEMICALS LTD., viscosity average molecular weight: 19,700)

(Component b)
PET: polyethylene terephthalate resin (TR-8580 of TEIJIN LIMITED)

(Polyester Other Than Component b)
PBT: polybutylene terephthalate resin (500FP of WinTech Polymer Ltd.)

(Component c)
GF-1: glass chopped strand bound together by a binding agent containing an epoxy resin as main component and a polyurethane (CS 3PE 944 of Nitto Boseki Co., Ltd., fiber diameter: 13 μm)
GF-2: glass chopped strand bound together by a binding agent containing a polyurethane (CS03MA409C of ASAHI FIBER GLASS CO., LTD., fiber diameter: 13 μm)

(Others)
ST-1: distearyl pentaerythritol diphosphite (ADEKA STAB PEP-8 of ASAHI DENKA CO., LTD.)
ST-2: trimethyl phosphate (TMP of DAIHACHI CHEMICAL INDUSTRY CO., LTD.)
CBM: master pellet resulting from melt mixing a polycarbonate resin (viscosity average molecular weight: 15,000) comprising bisphenol A as a dihydroxy component with Carbon Black #970 of Mitsubishi Chemical Corporation in a weight ratio of 60:40.

(Preparation of PCC-1)
To 100 parts by weight of polycarbonate resin powder (L-1225WP of Teijin Chemicals Ltd.) having a viscosity average molecular weight of 22,500, 0.2 parts by weight of pentaerythritol tetrastearate based mold releasing agent (RIKESTAR EW-400 of Riken Vitamin Co., Ltd.), 0.02 parts by weight of phosphonite based heat stabilizer (SANDOSTAB P-EPQ of Sandoz Ltd.), 0.08 parts by weight of hindered phenol based antioxidant (Irganox 1076 of Ciba Specialty Chemicals), 0.2 parts by weight of ultraviolet absorber (Tinuvin 1577 of Ciba Specialty Chemicals), 0.0002 parts by weight of bluing agent (Macrolex Violet B of Bayer AG) and 0.0005 parts by weight of the above CBM were added, and they were mixed together by a blender. Thereafter, the mixture was melt-kneaded by use of a vented twin-screw extruder so as to obtain pellets. The additives to be added to the polycarbonate resin powder were premixed with the powder to concentrations of 10 to 100 times of their amounts, and the premixtures were mixed together by the blender. As the vented twin-screw extruder, TEX30α (completely engaged, unidirectionally rotating, double thread screws) of Japan Steel Works, Ltd. was used. A kneading zone was provided before the vent. Extrusion conditions comprised a discharge rate of 20 kg/h, a screw revolution speed of 200 rpm, a vacuum degree of the vent of 3 kPa and an extrusion temperature from a first feed port to the die of 280° C. The above resin composition was produced in an atmosphere in which air cleaned through an HEPA filter was circulated, and extra care was taken so as to prevent mixing of foreign materials during the production.

(Preparation of Hard Coating Agent)

(Hereinafter, "Parts" Indicates "Parts by Weight" Unless Otherwise Stated.)

(1) Production of Acrylic Copolymer (Production of EMA-HEMA)
In a nitrogen-substituted flask equipped with a reflux condenser and an agitator, 97 parts of ethyl methacrylate (hereinafter abbreviated as "EMA"), 19.5 parts of 2-hydroxyethyl methacrylate (hereinafter abbreviated as "HEMA"), 0.18 parts of azobisisobutylonitrile (hereinafter abbreviated as "AIBN") and 200 parts of 1,2-dimethoxyethane were added, mixed together, and dissolved. Then, the mixture was allowed to react in a nitrogen current under agitation at 70° C. for 6 hours. The obtained reaction solution was added to n-hexane for the sake of purification by reprecipitation, thereby obtaining 100 parts of copolymer having a composition ratio of EMA/HEMA of 85/15 (molar ratio). The hydroxyl value of the copolymer was 72.1 mgKOH/g, and its weight average molecular weight measured by GPC (column: Shodex GPCA-804, eluent: THF) was 80,000 in terms of standard polystyrene.

Hereinafter, the acrylic copolymer will be referred to as "EMA-HEMA(I)".

(2) Preparation of Coating Composition for First Layer (Preparation of HC1)
5.8 parts of the above EMA-HEMA and 2.5 parts of 2-(4, 6-diphenyl-1,3,5-triazin-2-yl)-5-[(hexyl)oxy]-phenol were dissolved in a mixed solvent comprising 40 parts of methyl ethyl ketone, 20 parts of methyl isobutyl ketone and 25 parts of 2-methyl-2-propanol. Then, to this solution, 4.0 parts of TAKENATE XB-72-H6 (polyisocyanate compound precursor of MITSUI TAKEDA CHEMICALS, INC.) and 0.1 parts of APZ-6633 (silane coupling agent of Nippon Unicar Company Limited) were added so that the amount of isocyanate groups became 1.2 equivalents per equivalent of hydroxyl groups of the above EMA-HEMA, and the resulting mixture was stirred at 25° C. for 5 minutes to prepare a coating composition "HC1" for a first layer.

(3) Preparation of Coating Composition for Second Layer (Preparation of HC2)
To 100 parts of water dispersion type colloidal silica dispersion(SNOWTEX 30 of Nissan Chemical Industries, Ltd., solid content of 30 wt %), 12 parts of distilled water and 20 parts of acetic acid were added and stirred. To this dispersion, 134 parts of methyl trimethoxysilane was added while it was cooled in an ice water bath. To a reaction solution obtained by stirring this mixed solution at 25° C. for 1 hour, 1 part of sodium acetate was added as a curing catalyst, and the resulting solution was diluted with 200 parts of isopropanol so as to prepare an organosiloxane resin composition "HC2".

(4) Application of Hard Coating Agent

The above produced two-color injection molded article was annealed in a clean oven at 120° C. for 2 hours. Subsequently, the above prepared HC1 was applied on the surface of the transparent member which was not in contact with the frame member to a thickness of about 4 μm by flow coating and on the surface of the transparent member which was in contact with the frame member to a thickness of about 4 μm by brush coating, left to stand at 25° C. for 20 minutes, and then heat-set in a hot air circulating oven at 120° C. for 1 hour. Subsequently, on the coated surfaces of the molded article, HC-2 was applied to a thickness of about 6 μm in the same manner as HC-1 was applied, left to stand at 25° C. for 20 minutes, and then heat-set in a hot air circulating oven at 120° C. for 2 hours.

TABLE 1

|  |  |  |  | Examples |  |  |  |  |  |  |
|---|---|---|---|---|---|---|---|---|---|---|
|  |  |  | Unit | 1 | 2 | 3 | 4 | 5 | 6 | 7 |
| Composition | Component a | PC | parts by weight | 90 | 80 | 70 | 79 | 77 | 79 | 55 |
|  | Component b | PET | parts by weight | 10 | 20 | 30 | 21 | 23 | 21 | 45 |
|  | (Other Than b) | PBT | parts by weight |  |  |  |  |  |  |  |
|  | Component c | GF-1 | parts by weight |  |  |  | 5 | 18 |  | 11 |
|  |  | GF-2 | parts by weight |  |  |  |  |  | 5 |  |
|  | Others | ST-1 | parts by weight | 0.08 | 0.08 | 0.08 | 0.08 | 0.08 | 0.08 | 0.08 |
|  |  | ST-2 | parts by weight | 0.02 | 0.02 | 0.02 | 0.02 | 0.02 | 0.02 | 0.02 |
|  |  | CBM | parts by weight | 1 | 1 | 1 | 1 | 1 | 1 | 1 |
| Evaluation | Experiment 1 (%) |  |  | 100 | 100 | 100 | 95 | 88 | 75 | 75 |
|  | Experiment 2 |  |  | ○ | ○ | ○ | ◎ | ◎ | ○ | ○ |

|  |  |  |  | Comparative Examples |  |  |  |  |
|---|---|---|---|---|---|---|---|---|
|  |  |  | Unit | 1 | 2 | 3 | 4 | 5 |
| Composition | Component a | PC | parts by weight | 100 | 100 | 100 | 80 | 79 |
|  | Component b | PET | parts by weight |  |  |  |  |  |
|  | (Other Than b) | PBT | parts by weight |  |  |  | 20 | 21 |
|  | Component c | GF-1 | parts by weight |  | 5 | 18 |  | 5 |
|  |  | GF-2 | parts by weight |  |  |  |  |  |
|  | Others | ST-1 | parts by weight | 0.08 | 0.08 | 0.08 | 0.08 | 0.08 |
|  |  | ST-2 | parts by weight | 0.02 | 0.02 | 0.02 | 0.02 | 0.02 |
|  |  | CBM | parts by weight | 1 | 1 | 1 | 1 | 1 |
| Evaluation | Experiment 1 (%) |  |  | 27 | 10 | 5 | 67 | 48 |
|  | Experiment 2 |  |  | x | — | — | x | x |

Further, in the same manner as in the above Experiment 2, molded articles resulting from integrating a sheet molded article comprising the above PCC-1, having a width of about 40 cm, a length of about 130 cm and a thickness of 4 mm and having a slightly curved shape (convex surface where a frame member did not exist) with frame members comprising the compositions of the above Examples 2, 4 and 5, having a thickness of 2 mm and covering a peripheral portion having a width of about 7 cm were prepared by a large-scale molding machine capable of two component molding. After the molded articles were hard-coated in the same manner as described above, they were fixed to frame members made of a coated steel plate and of an aluminum alloy of No.6,061 in the same bonding manner as described above. The members kept a strongly bonded state even after a wet heat treatment test.

The invention claimed is:

1. A sheet window member comprising:
   A: a sheet material (A) comprising an aromatic polycarbonate resin,
   B: a frame member (B) laminated along the periphery of one surface of the sheet material (A), and
   C: a buffer layer (C) formed on the surface of the frame member (B),
   wherein
   the frame member (B) is formed from a resin composition comprising the following (i) to (iii):
   (i) 50 to 90 parts by weight of aromatic polycarbonate resin (B-1),
   (ii) 10 to 50 parts by weight of polyethylene terephthalate resin (B-2), and
   (iii) 0 to 50 parts by weight of fibrous filler (B-3) based on 100 parts by weight of the total of the (B-1) and the (B-2),
   and the buffer layer (C) is formed from a rubber resin composition comprising 1 to 50 wt % of inorganic filler, and having a Young's modulus of 0.5 to 50 MPa, having a lap shear strength of 1 to 7 MPa, and has a thickness of 2 to 10 mm, and is laminated on the frame member (B) via a primer layer.

2. The member of claim 1, wherein the frame member (B) is formed from a resin composition comprising the following components:
   (i) 70 to 88 parts by weight of aromatic polycarbonate resin (B-1),
   (ii) 12 to 30 parts by weight of polyethylene terephthalate resin (B-2), and
   (iii) 0 to 50 parts by weight of fibrous filler (B-3) based on 100 parts by weight of the total of the (B-1) and the (B-2).

3. The member of claim 1, wherein the content of the fibrous filler (B-3) is 1 to 50 parts by weight based on 100 parts by weight of the total of the (B-1) and the (B-2).

4. The member of claim 3, wherein the fibrous filler (B-3) is a fibrous filler bound with an epoxy resin.

5. The member of claim 3, wherein the fibrous filler (B-3) is glass fibers.

6. The member of claim 1, wherein buffer layer (C) is formed from a rubber resin composition comprising a cured rubber polyurethane resin.

7. The member of claim 1, wherein the sheet material (A) has a thickness of 1 to 10 mm.

8. The member of claim 1, wherein buffer layer (C) has a thickness of 2 to 8 mm per m of the maximum length of the sheet material (A).

9. The member of claim 1, wherein the sheet material (A) and the frame member (B) are an integrally molded article.

10. The member of claim 1, wherein the sheet material (A) and the frame member (B) are a two-color injection molded article.

11. A window structure comprising a metal frame laminated on the buffer layer (C) of the sheet window member of claim 1.

12. The structure of claim 11 wherein the metal frame is laminated on the buffer layer (C) via a primer layer.

13. The structure of claim 11, wherein the metal frame is an aluminum frame.

14. A vehicle having at least one window structure of claim 11 as a window.

15. A vehicle having windows comprising a plurality of the window structures of claim 11.

16. The member of claim 2, wherein the content of the fibrous filler (B3) is 1 to 50 parts by weight based on 100 parts by weight of the total of the (B-1) and the (B-2).

17. The member of claim 16, wherein the fibrous filler (B-3) is a fibrous filler bound with an epoxy resin.

18. The member of claim 16, wherein the fibrous filler (B-3) is glass fibers.

* * * * *